United States Patent
Kaneko

(10) Patent No.: US 11,669,289 B2
(45) Date of Patent: Jun. 6, 2023

(54) PRINTING APPARATUS THAT SAVES AND EXECUTES A PRINT JOB RECEIVED FROM AN INFORMATION PROCESSING TERMINAL, AND PRINTING SYSTEM, CONTROL METHOD, AND COMPUTER-READABLE STORAGE MEDIUM THEREOF

(71) Applicant: CANON KABUSHIKI KAISHA, Tokyo (JP)

(72) Inventor: Takayuki Kaneko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/208,406

(22) Filed: Mar. 22, 2021

(65) Prior Publication Data
US 2021/0303246 A1    Sep. 30, 2021

(30) Foreign Application Priority Data
Mar. 26, 2020   (JP) .............................. JP2020-056556

(51) Int. Cl.
*G06F 3/12*    (2006.01)

(52) U.S. Cl.
CPC .......... *G06F 3/1267* (2013.01); *G06F 3/1205* (2013.01); *G06F 3/1268* (2013.01)

(58) Field of Classification Search
CPC ...... G06F 3/1204; G06F 3/1212; G06F 3/126; G06F 3/1263; G06F 3/121; G06F 3/1215; G06F 3/1232; G06F 3/1235; G06F 3/124; G06F 3/1241; G06F 3/1256; G06F 3/1274; G06F 3/1275; G06F 3/1286; G06F 3/1288
See application file for complete search history.

(56) References Cited

U.S. PATENT DOCUMENTS

| | | | | |
|---|---|---|---|---|
| 9,846,824 B2 * | 12/2017 | Lin | ........................ | G06F 3/1231 |
| 10,768,872 B2 * | 9/2020 | Kaneko | .................. | G06F 3/1238 |
| 10,768,874 B2 * | 9/2020 | Nakajima | .............. | G06F 3/1238 |
| 10,783,413 B2 * | 9/2020 | Kimura | .............. | G06K 15/1807 |
| 2003/0208607 A1 * | 11/2003 | Yamazaki | ................ | G06F 3/126 |
| | | | | 709/229 |

(Continued)

FOREIGN PATENT DOCUMENTS

JP    2019064130 A    4/2019

*Primary Examiner* — Henok Shiferaw
(74) *Attorney, Agent, or Firm* — Canon U.S.A., Inc. IP Divsion

(57) ABSTRACT

A printing apparatus configured to store a first setting relating to print jobs designated for reserved printing, the first setting indicating an acceptance condition for accepting a print job designated for reserved printing, receive information of a print job and store the received information of the print job in a storage device. In a case where the received information of the print job indicates that the print job is a print job designated for reserved printing and the print job for which information has been received satisfies the acceptance condition indicated by the first setting, the information of the print job is stored in the storage device in a manner such that the print job is to be executed at the job execution time designated for the print job, and a print job corresponding to the stored information is executed at the job execution time designated in the stored information.

8 Claims, 23 Drawing Sheets

(56) References Cited

U.S. PATENT DOCUMENTS

| | | | |
|---|---|---|---|
| 2006/0187487 A1* | 8/2006 | Teranoshita | G06F 3/1204 |
| | | | 358/1.16 |
| 2008/0134186 A1* | 6/2008 | Sakai | G06F 21/608 |
| | | | 718/102 |
| 2008/0304099 A1* | 12/2008 | Yamada | G06K 15/1817 |
| | | | 358/1.15 |
| 2008/0316511 A1* | 12/2008 | Sakamoto | G03G 15/0194 |
| | | | 358/1.9 |
| 2010/0177345 A1* | 7/2010 | Watanabe | G06F 3/126 |
| | | | 358/1.15 |
| 2011/0170893 A1* | 7/2011 | Nishikawa | G03G 15/502 |
| | | | 399/81 |
| 2015/0070721 A1* | 3/2015 | Mihira | G06K 15/4055 |
| | | | 358/1.14 |
| 2015/0286446 A1* | 10/2015 | Nuggehalli | G06F 3/1267 |
| | | | 358/1.15 |
| 2016/0210094 A1* | 7/2016 | Nishikawa | H04N 1/00411 |
| 2017/0308341 A1* | 10/2017 | Ormond | H04N 1/00954 |
| 2019/0079714 A1* | 3/2019 | Kawanishi | G03G 15/553 |
| 2019/0107985 A1* | 4/2019 | Tomihisa | G06F 3/1267 |
| 2019/0146727 A1* | 5/2019 | Suzuki | G06F 3/1267 |
| | | | 358/1.15 |
| 2019/0356807 A1* | 11/2019 | Takahashi | H04N 1/00477 |

\* cited by examiner

FIG.17

1700 RESERVED PRINTING-ENABLED TIME PERIOD DESIGNATION SCREEN

RESERVED PRINTING

1701 — ☐ RESTRICT DESIGNATION-ENABLED PRINT START TIME

PRINT START-ENABLED TIME PERIOD

| 22 : 00 | – | 7 : 30 |

2200 HELD JOB LIST

| RECEPTION DATE AND TIME ~2201 | USER ID ~2202 | PRINT JOB NAME ~2203 | OUTPUT METHOD ~2204 | RESERVATION TIME ~2205 | STORAGE LOCATION ~2206 | |
|---|---|---|---|---|---|---|
| 2017/06/03 9:00 | Kaneko | AAA.txt | HOLD | NULL | /data/Kaneko/doc1 | ~2211 |
| 2017/06/03 9:05 | Sato | BBB.pdf | RESERVED PRINTING | 2017/06/04/03:00 | /data/Sato/doc1 | ~2212 |
| 2017/06/03 10:00 | Kaneko | CCC.doc | HOLD | NULL | /data/Kaneko/doc2 | ~2213 |
| 2017/06/03 10:00 | Kaneko | DDD.doc | HOLD | NULL | /data/Kaneko/doc3 | ~2214 |
| 2017/06/03 11:00 | Suzuki | EEE.doc | RESERVED PRINTING | 2017/06/04/04:00 | /data/Suzuki/doc1 | ~2215 |
| 2017/06/03 12:00 | Suzuki | FFF.doc | RESERVED PRINTING | 2017/06/04/04:30 | /data/Suzuki/doc2 | ~2216 |

PRINTING APPARATUS THAT SAVES AND EXECUTES A PRINT JOB RECEIVED FROM AN INFORMATION PROCESSING TERMINAL, AND PRINTING SYSTEM, CONTROL METHOD, AND COMPUTER-READABLE STORAGE MEDIUM THEREOF

BACKGROUND

Field

The present disclosure relates to a printing apparatus that is capable of saving and executing a print job received from an information processing terminal, a printing system, a control method, and a computer-readable storage medium.

Description of the Related Art

Some image formation apparatuses perform "reserved printing". That is, upon receipt of a reserved job which is a print job with a print start time designated from an information processing terminal, the image formation apparatus does not perform printing immediately but starts printing at a designated time (see, for example, Japanese Patent Application Laid-Open No. 2019-64130).

In one of main usage patterns of the "reserved printing" described above, a user who wishes to perform a large-volume printing may designate the print start time within late night hours or a lunch break time to avoid interfering with other users' use of the image formation apparatus, for example.

Therefore, it is desirable for such an image formation apparatus to be able to accept print job reservations under an operational condition such as the designated print start time being within late night hours or a lunch break time, for example.

SUMMARY

According to various embodiments of the present disclosure, a printing apparatus is provided which is configured to execute a print job. The printing apparatus includes one or more memories, wherein a first setting relating to print jobs designated for reserved printing is stored in the one or more memories, the first setting indicating an acceptance condition for accepting a print job designated for reserved printing, and wherein the print job designated for reserved printing is a print job for which a job execution time is designated, and one or more processors that execute a set of instructions to receive information about the print job, and store the received information of the print job in a storage device, wherein, in a case where the received information of the print job indicates that the print job is a print job designated for reserved printing and where the print job for which information has been received, satisfies the acceptance condition indicated by the first setting, the information of the print job is stored in the storage device in a manner such that the print job is to be executed at the job execution time designated for the print job, and wherein a print job corresponding to the stored information is executed at the job execution time designated in the stored information.

Further features of various embodiments of the present disclosure will become apparent from the following description of exemplary embodiments with reference to the attached drawings.

BRIEF DESCRIPTION OF THE DRAWINGS

FIG. 17 illustrates a reserved printing-enabled time period designation screen in the image formation apparatus according to one embodiment.

FIG. 22 illustrates an example of a held job list according to one embodiment.

DESCRIPTION OF THE EMBODIMENTS

Hereinafter, exemplary embodiments for carrying out the present disclosure will be described with reference to the drawings.

A first exemplary embodiment will be described. As the present exemplary embodiment, a control method for print jobs in an image formation apparatus will be described. The image formation apparatus receives a print job with a designated print start time (hereinafter, referred to as a reserved print job or reserved job) from an external apparatus such as an information processing terminal. The print start time will also be referred to as a reservation time or job execution time herein. Among other things, a control method for executing reserved print jobs is described herein, by which only reserved print jobs with reservation times set within a specific time period are executed.

Figure 1:
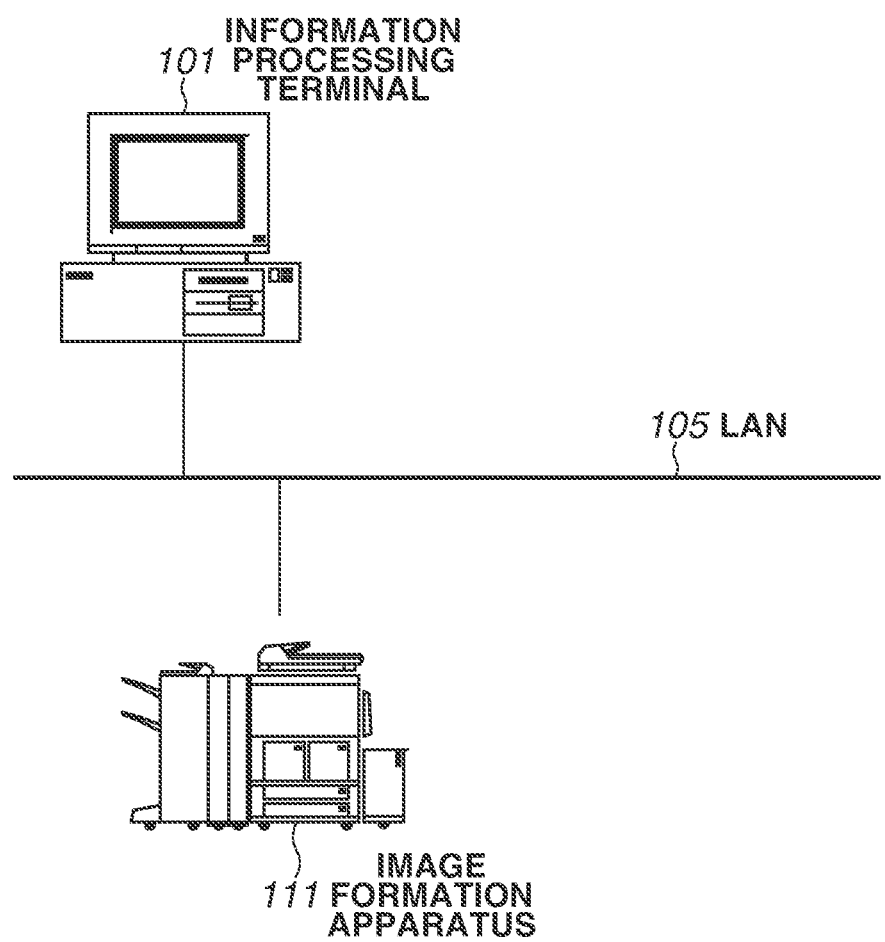
FIG. 1 illustrates a system configuration according to one embodiment.

FIG. 1 illustrates a configuration example of a printing system. Referring to FIG. 1, an information processing terminal 101 is connectable to a network. An image formation apparatus 111 is capable of executing a print job received from the information processing terminal 101.

Figure 2:
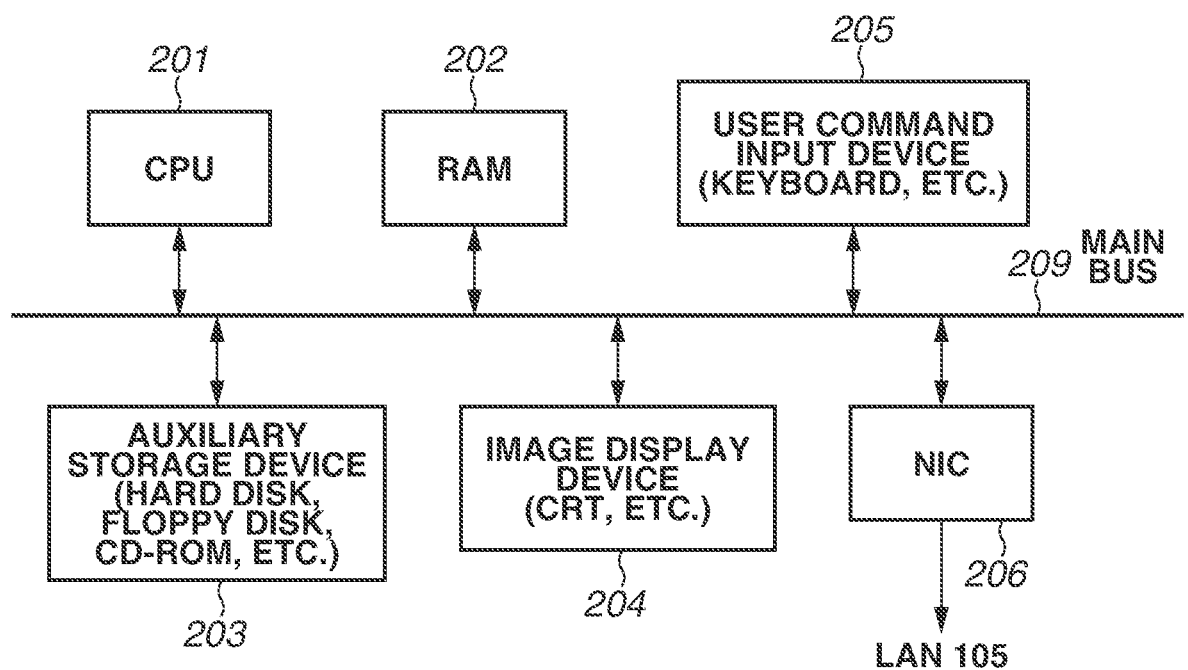
FIG. 2 is a block diagram illustrating an inner configuration of an information processing terminal according to one embodiment.

FIG. 2 illustrates an example of an inner configuration of a general information processing terminal, which is an inner configuration of the information processing terminal 101 illustrated in FIG. 1. A central processing unit (CPU) 201 performs information processing to control the information processing terminal 101. A random access memory (RAM) 202 provides a work area for the CPU 201. An auxiliary storage device 203 (a hard disk, floppy disk, compact disc read only memory (CD-ROM), or the like) provides control programs in the present exemplary embodiment. An image display device 204 (specifically, a cathode ray tube (CRT) display, liquid crystal display, or the like) is used to convey messages to the user. A user command input device (specifically, a mouse, keyboard, or the like) 205 is used by the user to input commands. A network interface card (NIC) 206 exchanges data with other network devices via a local area network (LAN) 220. A main bus 209 is provided for the components described above.

Figure 3:
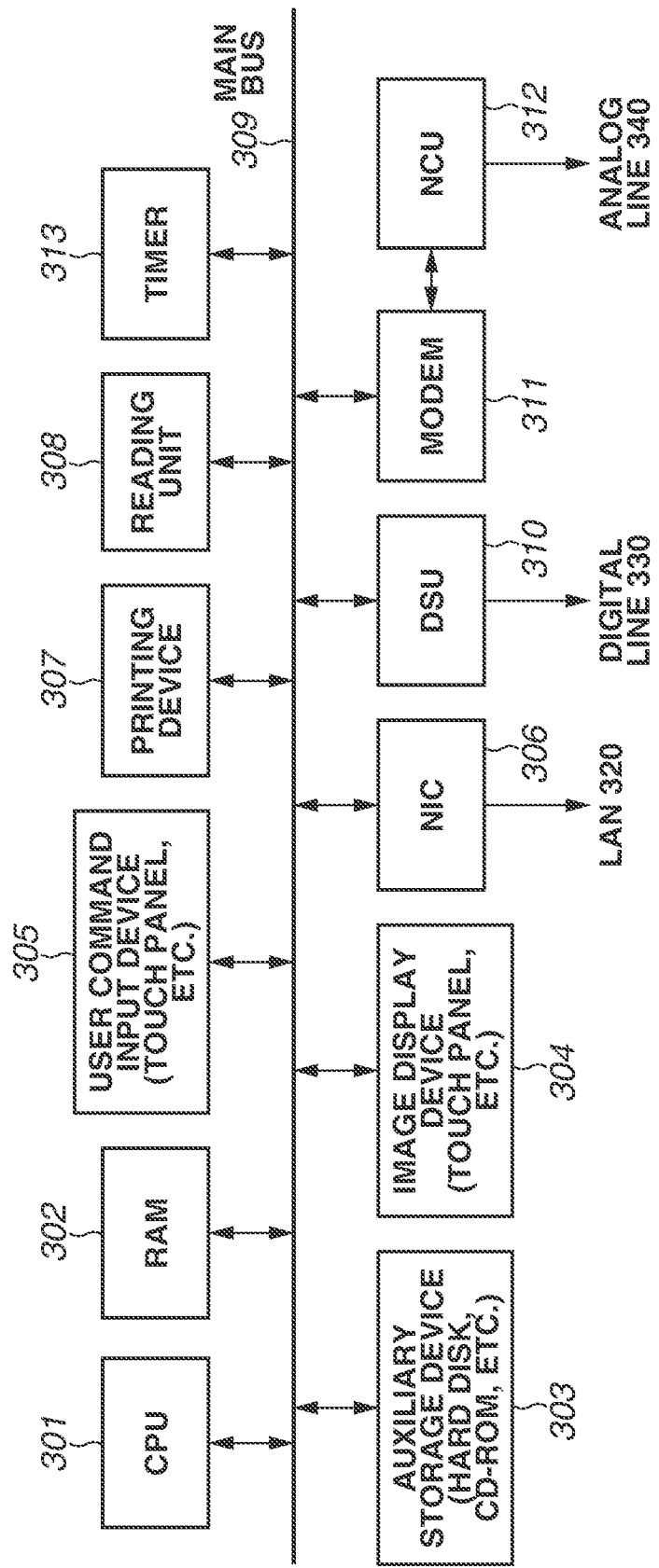
FIG. 3 is a block diagram illustrating an inner configuration of an image formation apparatus according to one embodiment.

FIG. 3 illustrates an example of an inner configuration of the image formation apparatus. Referring to FIG. 3, a CPU 301 performs information processing in controlling the image formation apparatus 111. A RAM 302 provides a work area for the CPU 301 and temporarily stores data. An auxiliary storage device (a hard disk, CD-ROM, or the like) 303 temporarily stores data and is used instead of the RAM 302. An image display device 304 such as a touch panel is used to display the status of the image formation apparatus, error messages, and the like. An operation unit 305 is operated by the user to designate a desired print job with a user command input device (such as a touch panel). An NIC 306 exchanges data with other network devices via a LAN 320. A printing device 307 prints scanned image data or the like on paper sheets. A reading unit (scanner) 308 scans a paper document placed on the platen glass to generate monochrome binary image data and polychrome multi-value image data. The read image data can be printed by the printing device 307, or can be held in a storage unit such as the auxiliary storage device 303 and then printed at an arbitrary timing. A digital service unit (DSU) 310 is connected to a digital line 330 and used for data transmission and reception. A network control unit (NCU) 312 is connected to an analog line 340 to open and close the line, control incoming and outgoing calls, and transmit and receive image data (analog). A modem 311 modulates and demodulates transmission data and reception data. A timer 313 performs time management and is used for time determination in printing a reserved print job at a reservation time.

Figure 4:
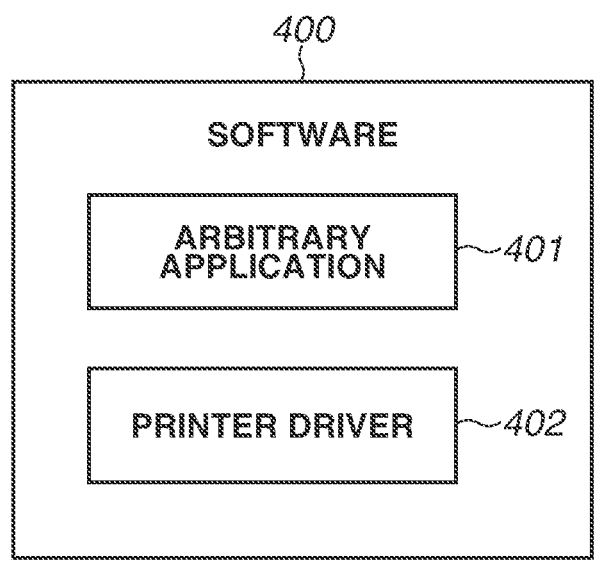
FIG. 4 is a module diagram of a control program in the information processing terminal according to one embodiment.

FIG. 4 illustrates an example of software related to the present exemplary embodiment, which is stored in the auxiliary storage device 203 of the information processing terminal 101. An application 401 is an arbitrary drawing application such as a text editor. A printer driver 402 generates a print job interpretable for the image formation apparatus 111 under an instruction from the arbitrary application 401 and transmits the generated print job to the image formation apparatus 111. The arbitrary application 401 and the printer driver 402 are read out from the auxiliary storage device 203 to the RAM 202 and implemented by the CPU 201.

Figure 6:
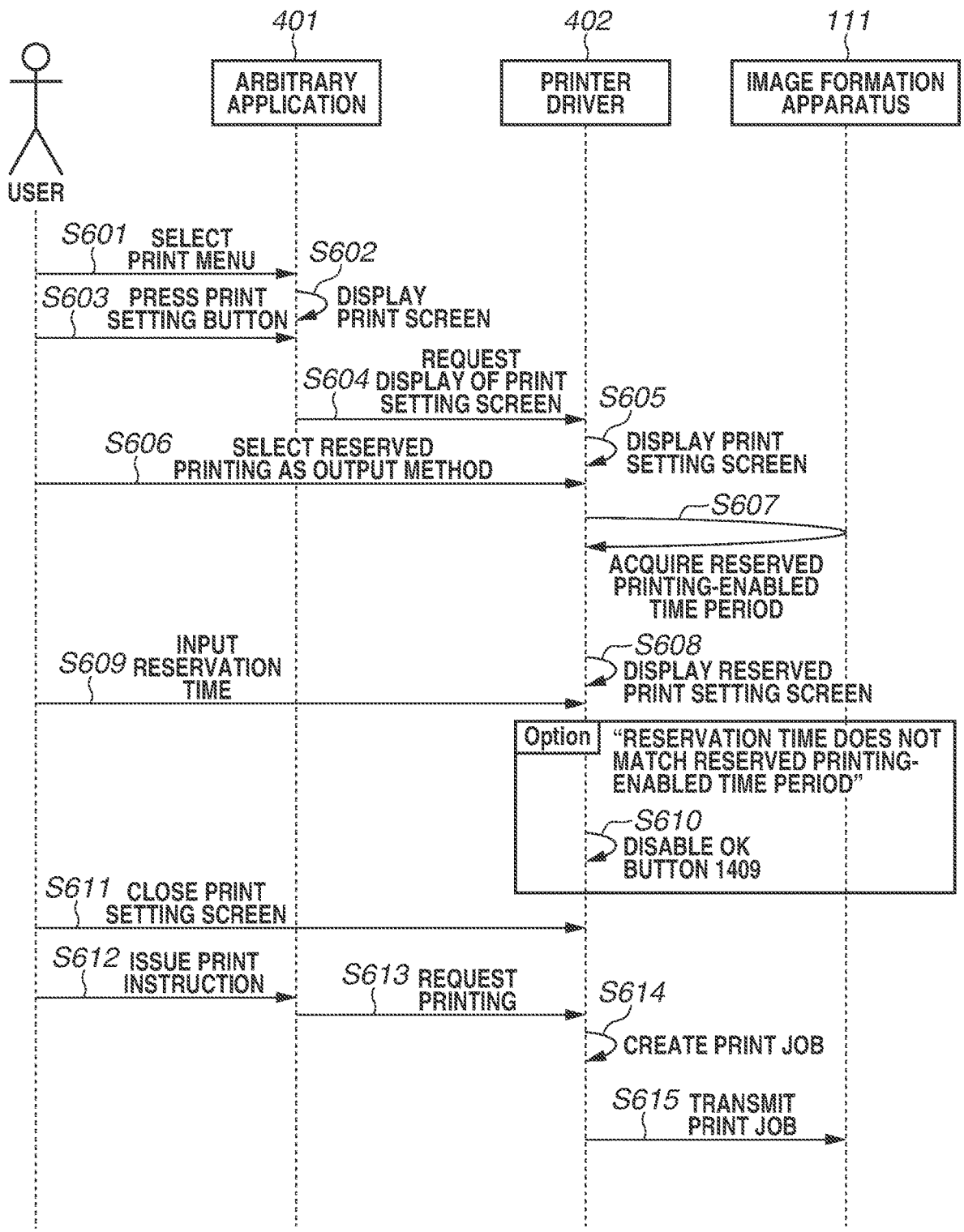
FIG. 6 is a sequence diagram illustrating a flow of print job generation processing in the information processing terminal according to one embodiment.

FIG. 6 is a sequence diagram illustrating a process performed by the user to transmit a print job to the image formation apparatus 111 using the arbitrary application 401 and the printer driver 402. If the user wishes to perform printing during the use of the arbitrary application 401 such as a text editor, the user selects a print menu in the arbitrary application 401 in step S601. When the print menu is selected by the user, the arbitrary application 401 displays a print screen for selecting a printer and making print settings in step S602. When the user presses a button for calling the printer driver (a print setting button in this case) in the print screen in step S603, the arbitrary application 401 makes a print setting screen display request to the printer driver 402 in step S604. When an instruction for displaying the print setting screen display is issued in step S604, the printer driver 402 displays a printer driver screen illustrated in FIG. 14.

Figure 14:
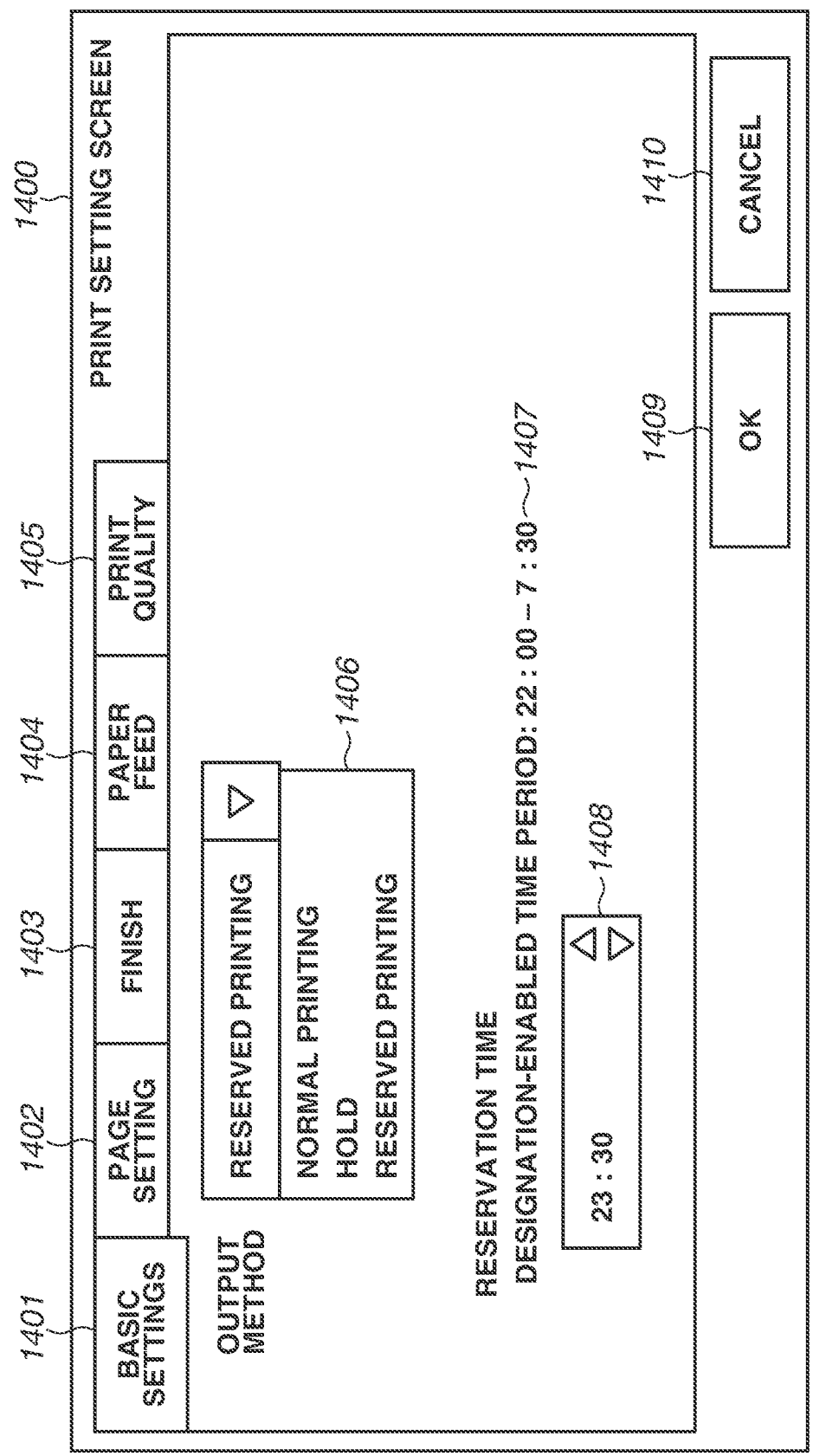
FIG. 14 illustrates an example of a print instruction screen of a printer driver according to one embodiment.

FIG. 14 illustrates an example of a print setting screen displayed by the printer driver 402 on the information processing terminal 101. An output method 1406 designates a method for processing a print job by the image formation apparatus 111. In the present exemplary embodiment, the user can select the output method 1406 from among "normal printing", "hold", and "reserved printing". When the user selects reserved printing as the output method 1406 in step S606, the printer driver 402 acquires information 2400 indicating a reserved printing-enabled time period from the image formation apparatus 111 in step S607. The printer driver 402 displays the acquired information 2400 in a display area 1407 of a print setting screen 1400 in step S608. Next, the user inputs a reservation time to an input control 1408 in step S609. In this case, the printer driver 402 allows only an input of a time within the time period described in the acquired information 2400. Specifically, if the reservation time input to the input control 1408 is not within the reserved printing-enabled time period acquired in step S607, the printer driver 402 disables an OK button 1409 so that the OK button 1409 cannot be pressed in step S610. In the print setting screen 1400, the user may be allowed to set the number of printing copies and make staple setting, punching setting, paper feed setting, resolution setting, print color designation, and the like from menu items 1402 to 1405, for example. The OK button 1409 is used to confirm the various print settings made in the print setting screen 1400 and close the print setting screen 1400. A cancel button 1410 is used to cancel the various print settings made in the print setting screen 1400 and close the print setting screen 1400. When the user closes the print setting screen 1400 in step S611 and issues a print instruction in the print screen of the arbitrary application 401 in step S612, the arbitrary application 401 makes a printing request to the printer driver 402 in step S613. In response to the printing request, the printer driver 402 creates a print job 2100 in step S614 and transmits the print job 2100 to the image formation apparatus 111 in step S615. The control of the image formation apparatus depending on the output method 1406 will be described below.

Figure 7:
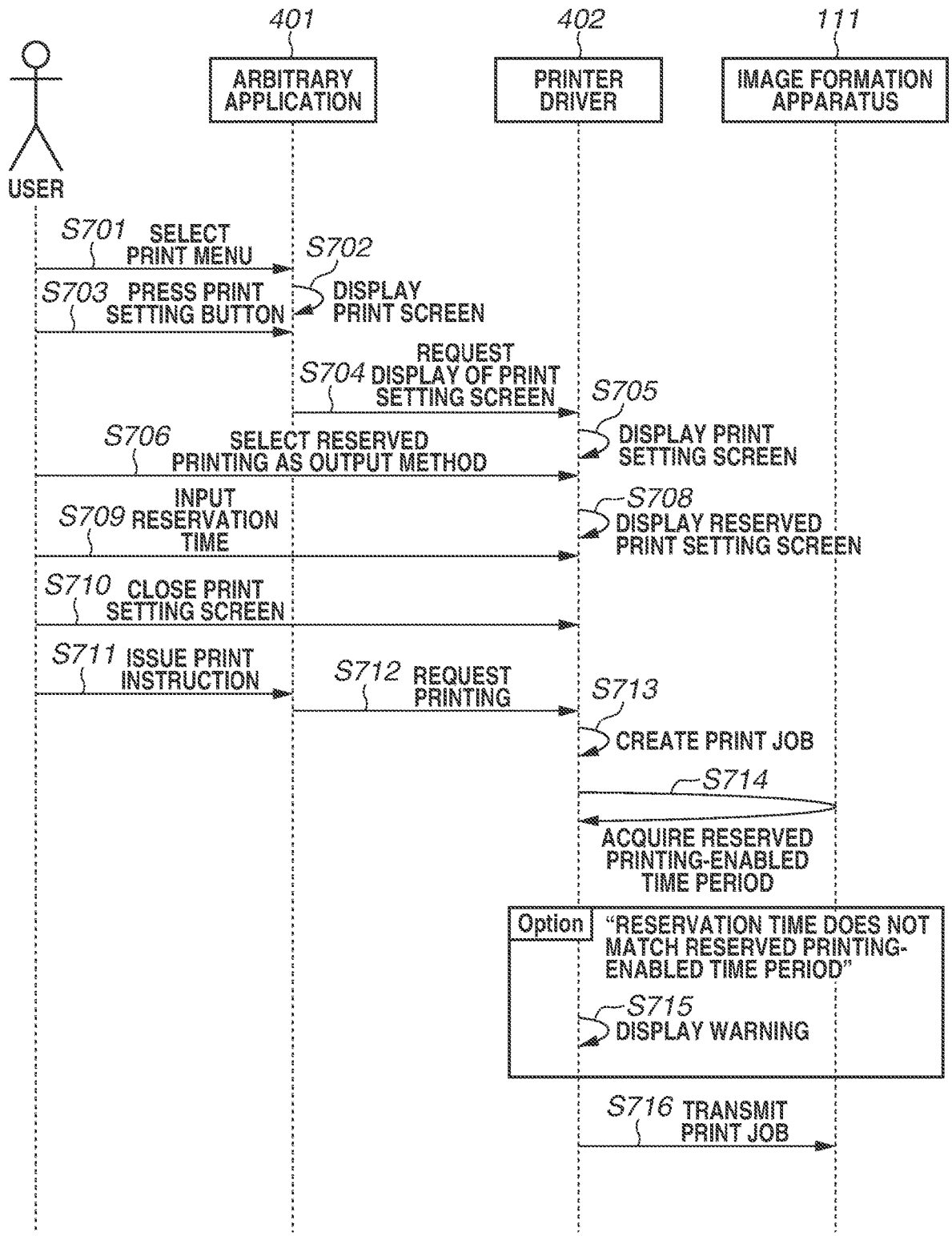
FIG. 7 is a sequence diagram illustrating a flow of print job generation processing in the information processing terminal according to one embodiment.
Figure 23:
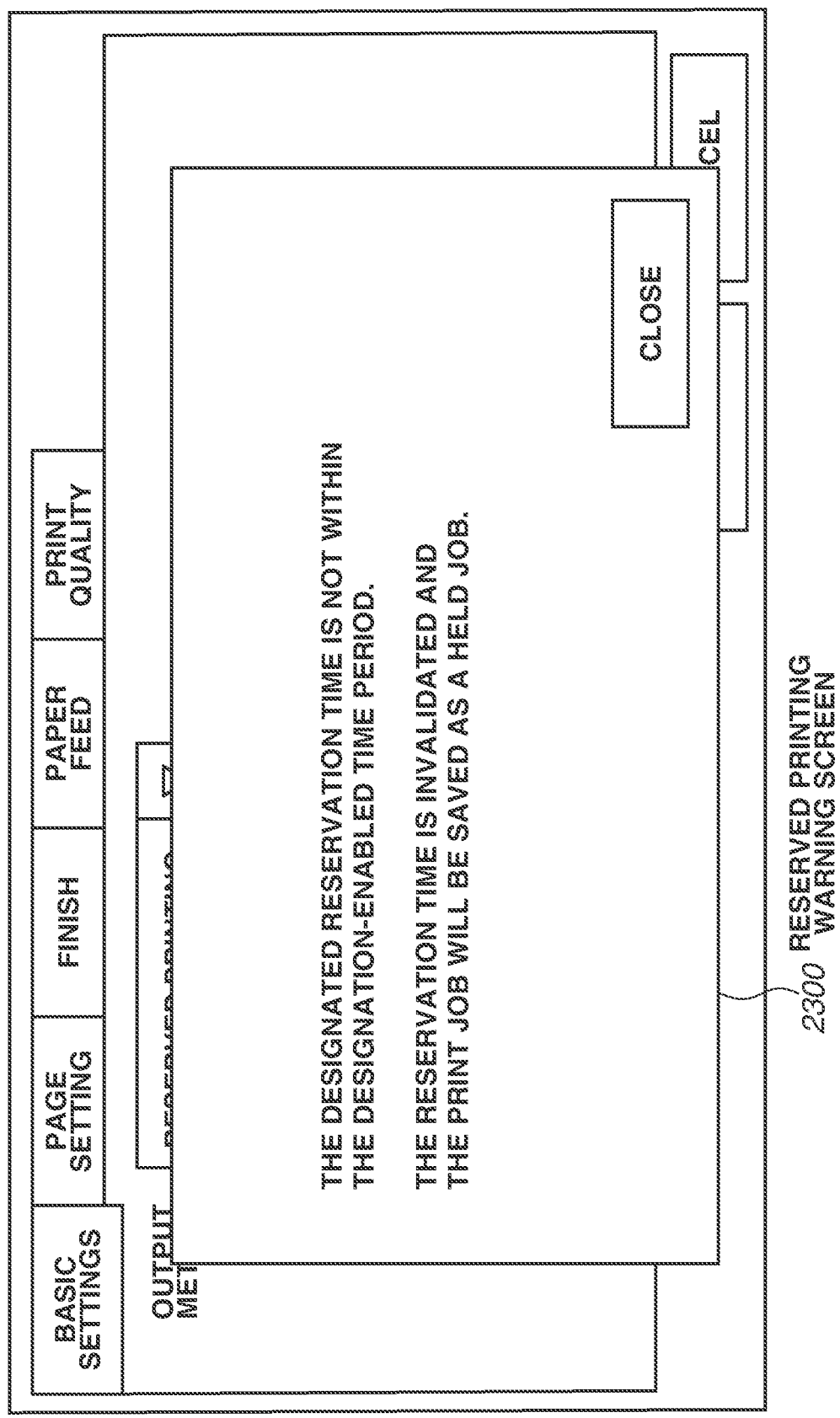
FIG. 23 illustrates an example of a reserved print warning screen according to one embodiment.

FIG. 6 illustrates a case where a process of disabling the OK button 1409 in the print setting screen 1400 is performed in step S610 in a case where the reservation time does not match the reserved printing-enabled time period. Alternatively, the printer driver 402 may notify and warn the user of the mismatch in a case where the reservation time does not match the reserved printing-enabled time period. FIG. 7 is a sequence diagram illustrating a process performed by the printer driver 402 to warn the user when the reservation time does not match the reserved printing-enabled time period. Here, only the difference between FIG. 6 and FIG. 7 will be described. Referring to FIG. 6, when the user selects reserved printing as the output method in step S607, the printer driver 402 acquires the reserved printing-enabled time period from the image formation apparatus 111 in step S607. On the other hand, referring to FIG. 7, the printer driver 402 acquires the reserved printing-enabled time period in step S714 immediately before the printer driver 402 transmits the print job to the image formation apparatus 111 in step S716. Referring to FIG. 6, in a case where the reservation time input by the user does not match the reserved printing-enabled time period, the printer driver 402 disables the OK button 1409 in step S610. On the other hand, referring to FIG. 7, in a case where the reservation time does not match the reserved printing-enabled time period immediately after the printer driver 402 acquires the reserved printing-enabled time period from the image formation apparatus 111 in step S714, the printer driver 402 displays a warning in step S715. The display of a warning here is, for example, the display of a reserved printing warning screen 2300 illustrated in FIG. 23. The reserved printing warning screen 2300 is a warning screen that is displayed when the reserved print job 2100 received by a print job management unit 502 is saved as a held job with the reservation time disabled, as in step S811 of FIG. 8 described below. In a system where the print job management unit 502 cancels the job in a case where the reservation time of the job does not match the reserved printing-enabled time period, the printer driver 402 warns that the job will be canceled.

Figure 21:
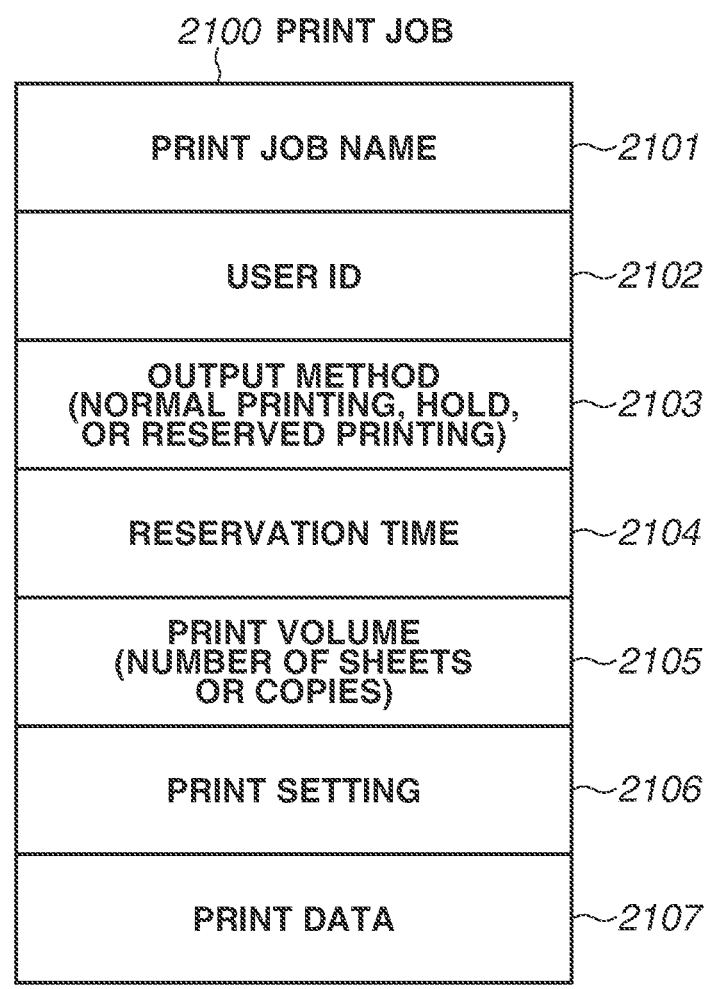
FIG. 21 illustrates a configuration example of a print job according to one embodiment.

FIG. 21 illustrates an example of a print job generated by the printer driver 402. A print job name 2101 indicates the name of the print job. A user ID 2102 identifies the user of the information processing terminal. The user ID 2102 may be explicitly designated by the user in the print setting screen 1400. An output method 2103 corresponds to the output method 1406 designated by the user in the print setting screen 1400. A reservation time 2104 corresponds to the reservation time designated by the user in the input control 1408 on the print setting screen 1400. A print volume 2105 indicates the number of printed sheets or the number of printing copies. Print settings 2106 include staple setting, punching setting, paper feed setting, resolution setting, print color setting, and the like. Print data 2107 is designated from arbitrary drawing software such as a text editor.

Figure 5:
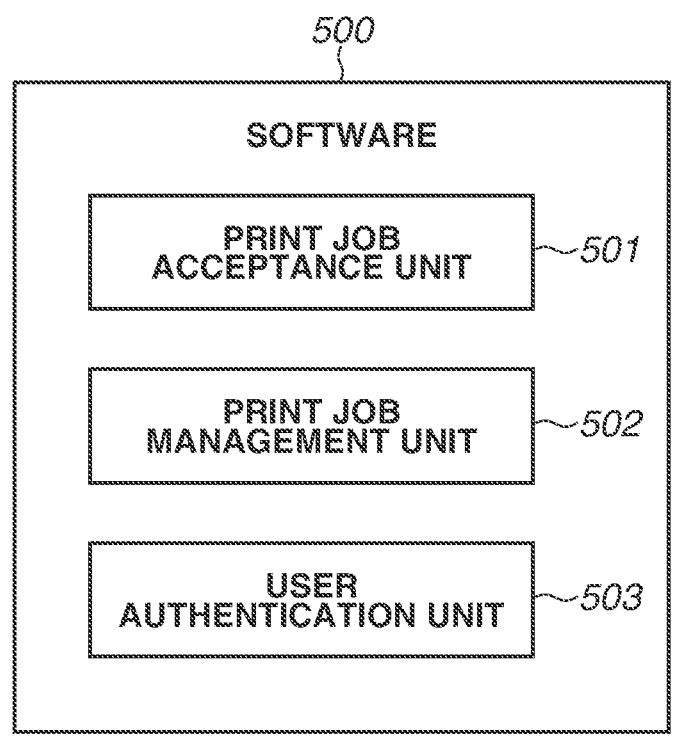
FIG. 5 is a module diagram of a control program in the image formation apparatus.

FIG. 5 illustrates an example of program modules relating to the present exemplary embodiment, which are stored in the auxiliary storage device 303 of the image formation apparatus 111. Control modules 501 to 503 are read from the auxiliary storage device 303 to the RAM 302 and implemented by the CPU 301.

A print job acceptance unit 501 receives the print job 2100 from the information processing terminal 101 by the NIC 306 and delivers the print job 2100 to the print job management unit 502. The print job management unit 502 is used to analyze the print job 2100 input from the information processing terminal 101 and execute the print job 2100 stored in the auxiliary storage device 303 using the printing device 307. The user authentication unit 503 identifies the user of the image formation apparatus 111. The user authentication information can be input through the user command input device 305.

FIG. 17 illustrates a reserved printing-enabled time period designation screen 1700 for designating a predetermined time period during which reserved print jobs are executable in the image formation apparatus 111. In the present disclosure, the reserved printing-enabled time is determined, not by the time when a reserved print job was received but by the reservation time when the reserved print job is to be actually printed. For example, if the reserved printing-enabled time period is 22:00 to 7:30, the print job 2100 the reservation time 2104 of which is 19:00 will not be permitted, and the print job 2100 the reservation time 2104 of which is 23:00 will be permitted. A check box 1701 is intended for designating whether to set the reserved printing-enabled time period. When the check box 1701 is not checked, no reserved printing-enabled time period will be set so that reserved print jobs will be permitted at any time. In a case where the check box 1701 is checked, only reserved print jobs the reservation times 2104 of which are within the time period set in the fields 1702 and 1703 will be permitted. The reserved printing-enabled time period set in the reserved printing-enabled time period designation screen 1700 is saved as reserved printing-enabled time period information 2400 by the print job management unit 502 in the RAM 302 or the auxiliary storage device 303.

TABLE 1

Reserved printing-enabled time period information 2400

| | | |
|---|---|---|
| Reserved print time period restriction | n (n = 0: not restricted, n = 1: restricted) | 2401 |
| Printing-enabled start time | 2200 (HHMM) | 2402 |
| Printing-enabled end time | 0730 (HHMM) | 2403 |

Software 500 can refer to the reserved printing-enabled time period information 2400 at an arbitrary timing. A reserved printing time period restriction 2401 in the reserved printing-enabled time period information 2400 reflects the content of the setting made in the check box 1701 in the reserved printing-enabled time period designation screen 1700. In a case where the check box 1701 is not checked, the reserved printing time period restriction 2401 is 0, whereas, in a case where the check box 1701 is checked, the reserved printing time period restriction 2401 is 1. A printing-enabled start time 2402 in the reserved printing-enabled time period information 2400 is set to the time designated in the field 1702 of the reserved printing-enabled time period designation screen 1700. A printing-enabled end time 2403 in the time period information 2400 is set to the time designated in the field 1703 of the reserved printing-enabled time period designation screen 1700.

Figure 8:
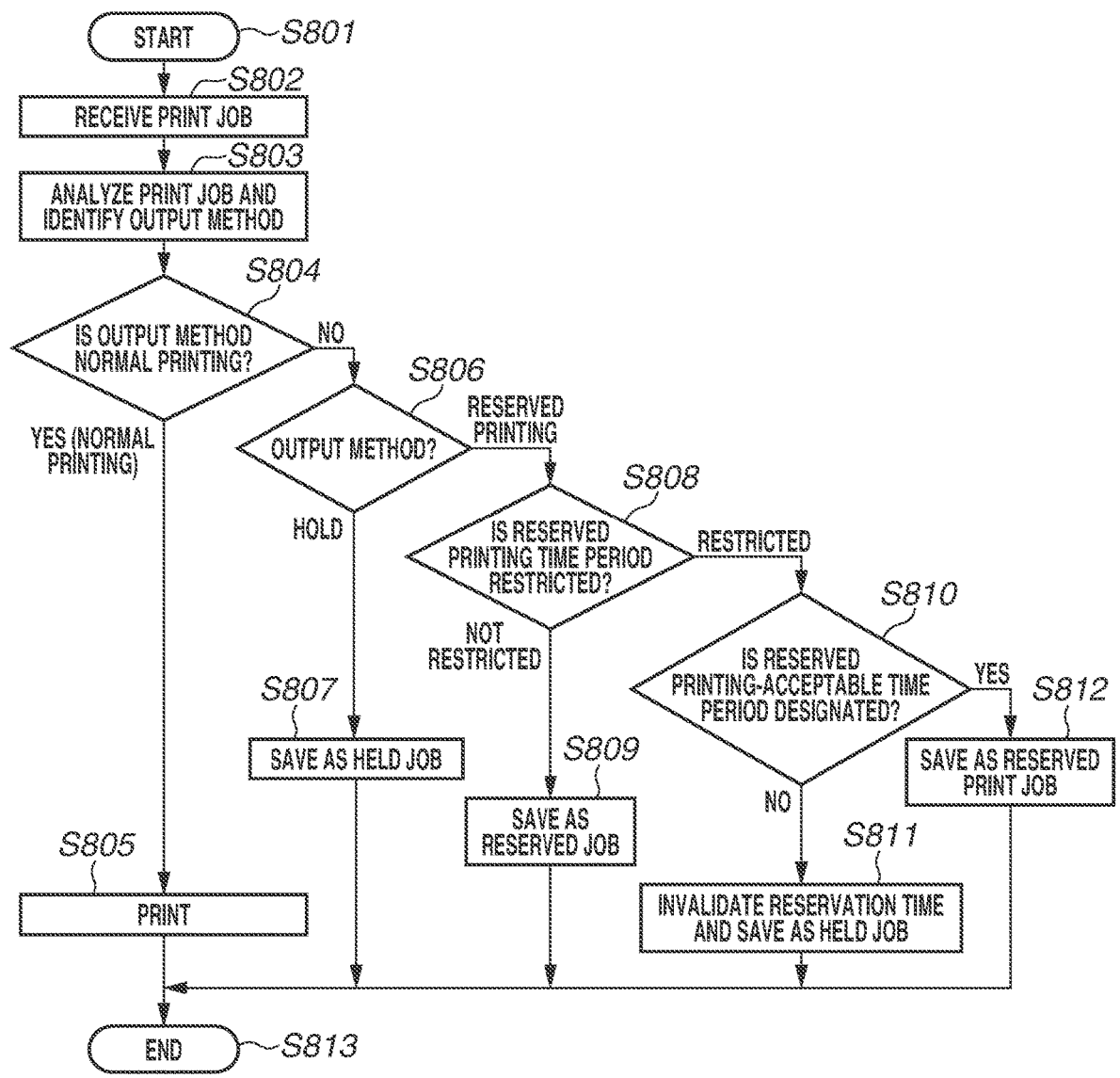
FIG. 8 is a flowchart illustrating a flow of print job reception processing in the image formation apparatus according to one embodiment.

FIG. 8 is a flowchart illustrating the details of processing performed by the software 500 running on the image formation apparatus 111. When the print job acceptance unit 501 receives the print job 2100 in step S802, the print job management unit 502 analyzes the output method 2103 of the print job 2100 in step S803. If the print job management unit 502 determines in step S804 that the output method 2103 is "normal printing", the print job management unit 502 performs the print job 2100 using the printing device 307 in step S805. If the print job management unit 502 determines in step S804 that the output method is not "normal printing", the print job management unit 502 determines in step S806 whether the output method is "hold" or "reserved printing". If the print job management unit 502 determines in step S806 that the output method is "hold", the print job management unit 502 saves the received print job 2100 as a held job in step S807. More specifically, the print job management unit 502 saves the print job 2100 in the auxiliary storage device 303 and adds the print job 2100 an output method 2204 of which is "hold" to a held job list 2200 illustrated in FIG. 22. If the print job management unit 502 determines in step S806 that the output method 2103 is "reserved printing", the print job management unit 502 refers to the reserved printing time period restriction 2401 in the reserved printing-enabled time period information 2400 to check whether the reserved printing time period is restricted in step S808. That is, in this case, the print job management unit 502 checks whether an acceptance condition exclusively for reserved jobs is set. If the print job management unit 502 determines in step S808 that the reserved printing time period is not restricted, the print job management unit 502 saves the print job 2100 as a reserved print job in step S809. More specifically, the print job management unit 502 saves the print job 2100 in the auxiliary storage device 303, and adds the print job 2100 the output method 2204 of which is "reserved printing" to the held job list 2200. If the print job management unit 502 determines in step S808 that the reserved printing time period is restricted, the print job management unit 502 checks whether the reservation time 2104 of the print job 2100 is within the range between the printing-enabled start time 2402 and the printing-enabled end time 2403 in step S810. If the print job management unit 502 determines in step S810 that the reservation time 2104 is not within the range between the printing-enabled start time 2402 and the printing-enabled end time 2403, the print job management unit 502 saves the received print job 2100 as a held job in step S811. More specifically, the print job management unit 502 saves the print job 2100 in the auxiliary storage device 303, and adds the print job 2100 the output method 2204 of which is "hold", not "reserved printing", to the held job list 2200 illustrated in FIG. 22. If the print job management unit 502 determines in step S810 that the reservation time 2104 is within the range between the printing-enabled start time 2402 and the printing-enabled end time 2403, the print job management unit 502 saves the received print job 2100 as a reserved print job in step S812.

In the present exemplary embodiment, the print job management unit 502 saves the print job 2100 as a held job in step S811. In an alternative mode, the print job management unit 502 may cancel the job.

In the present exemplary embodiment, the image formation apparatus saves the information about the print job in the auxiliary storage device 303 within the image formation apparatus itself. Alternatively, another image formation apparatus, a print server, or a cloud service, not illustrated, may have a storage unit in which the print job is saved. Further, another image formation apparatus, a print server, or a cloud service may receive and save the information about the print job. In that case, the image formation apparatus may acquire the information about the print job from the other image formation apparatus, print server, or cloud service, and execute the print job.

FIG. 22 illustrates a held job list for managing a list of print jobs saved by the print job management unit 502 in the auxiliary storage device 303. The held job list 2200 is managed in the auxiliary storage device 303 or the RAM 302, and the print job management unit 502 can read or write information from or to the held job list 2200 at an arbitrary timing. In the held job list 2200, reception date and time 2201 indicates the date and time when the print job acceptance unit 501 received the print job 2100. A user ID 2202 indicates the user ID 2102 included in the print job 2100. A print job name 2203 indicates the print job name 2101 included in the print job 2100. Information 2204 indicates the output method for the print job held in the auxiliary storage device 303. In a case where the print job management unit 502 holds the print job 2100 as a reserved print job, the print job 2100 is managed with the output method 2204 as "reserved printing". In a case where the print job management unit 502 holds the print job 2100 as a held job, the print job 2100 is managed with the output method 2204 as "hold". A reservation time 2205 indicates the reservation time 2104 included in the print job 2100. A storage location 2206 indicates the storage location of the print job 2100 saved by the print job management unit 502 in the auxiliary storage device 303. The print job management unit 502 can uniquely identify the print job 2100 saved in the auxiliary storage device 303 by the storage location 2206. However, the details on the method for identifying the print job 2100 are not important in the present exemplary embodiment, and thus detailed description thereof will be omitted.

Figure 12:
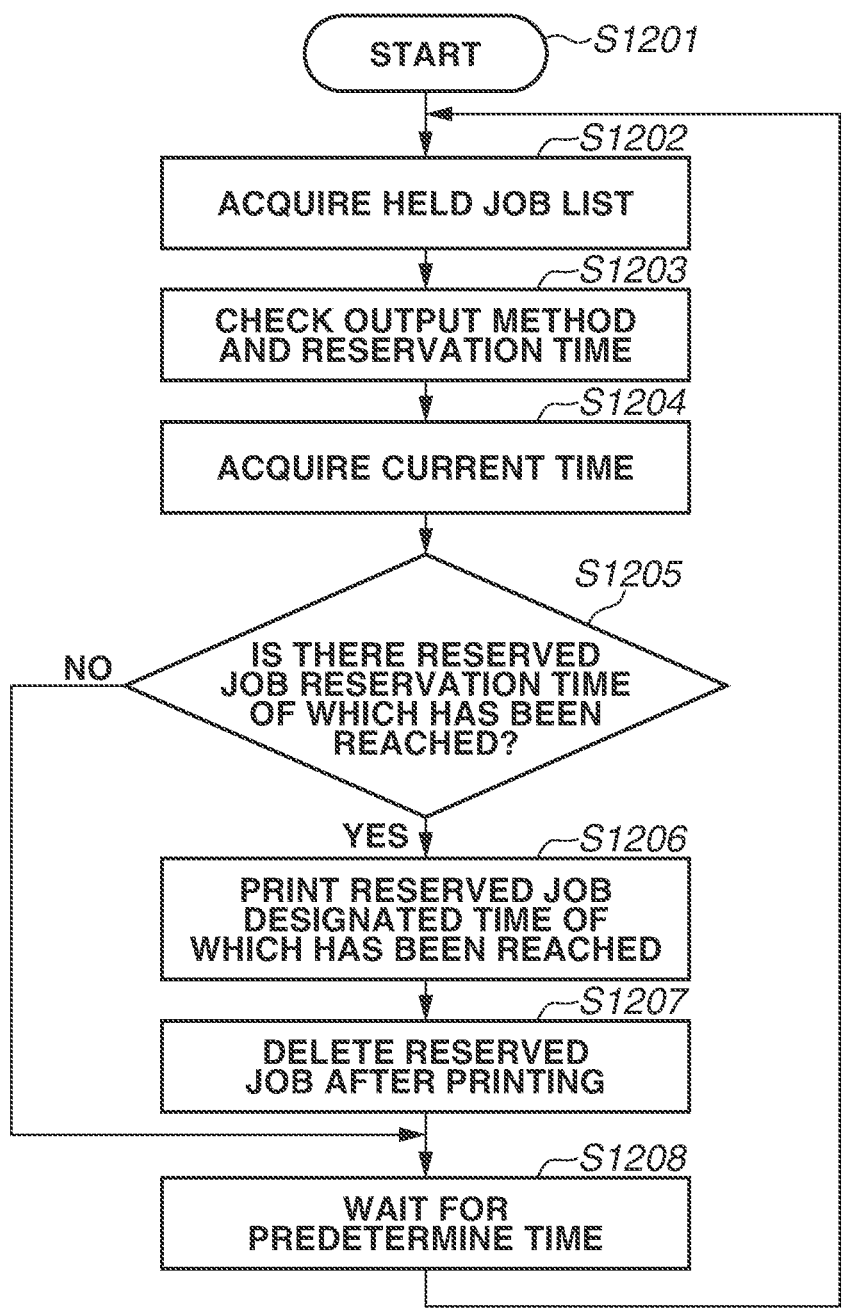
FIG. 12 is a flowchart illustrating a flow of print processing of a reserved print job in the image formation apparatus according to one embodiment.

FIG. 12 is a flowchart illustrating the details of processing performed by the print job management unit 502 to execute a reserved print job stored in the auxiliary storage device 303. In the present exemplary embodiment, the print job management unit 502 refers to the held job list 2200 by periodic processing and executes a reserved print job the reservation time of which has been reached. It is noted that the present disclosure is also applicable to a mode in which the print job management unit 502 cooperates with the timer to autonomously execute a reserved print job when the reservation time has been reached. When the periodic processing starts, the print job management unit 502 refers to the held job list 2200 in step S1202 to check the output method 2204 and the reservation time 2205 in step S1203. Then, in step S1204, the print job management unit 502 acquires the current time from the timer 313, and checks whether there is a reserved print job the reservation time of which has been reached in step S1205 based on the output method 2204 and the reservation time 2205 checked in step S1203. If the print job management unit 502 determines in step S1205 that there is a reserved print job the reservation time of which has been reached, the print job management unit 502 executes the reserved print job in step S1206. Then, the print job management unit 502 deletes the reserved print job from the auxiliary storage device 303, and also deletes the information about the print job from the held job list 2200 in step S1207. Then, in step S1208, the print job management unit 502 waits for a predetermined time (for example, ten seconds), and performs again the operation in step S1202. In a case where the print job management unit 502 determines in step S1205 that there is no reserved print job the reservation time of which has been reached, the print job management unit 502 performs the operation in step S1208.

Figure 13:
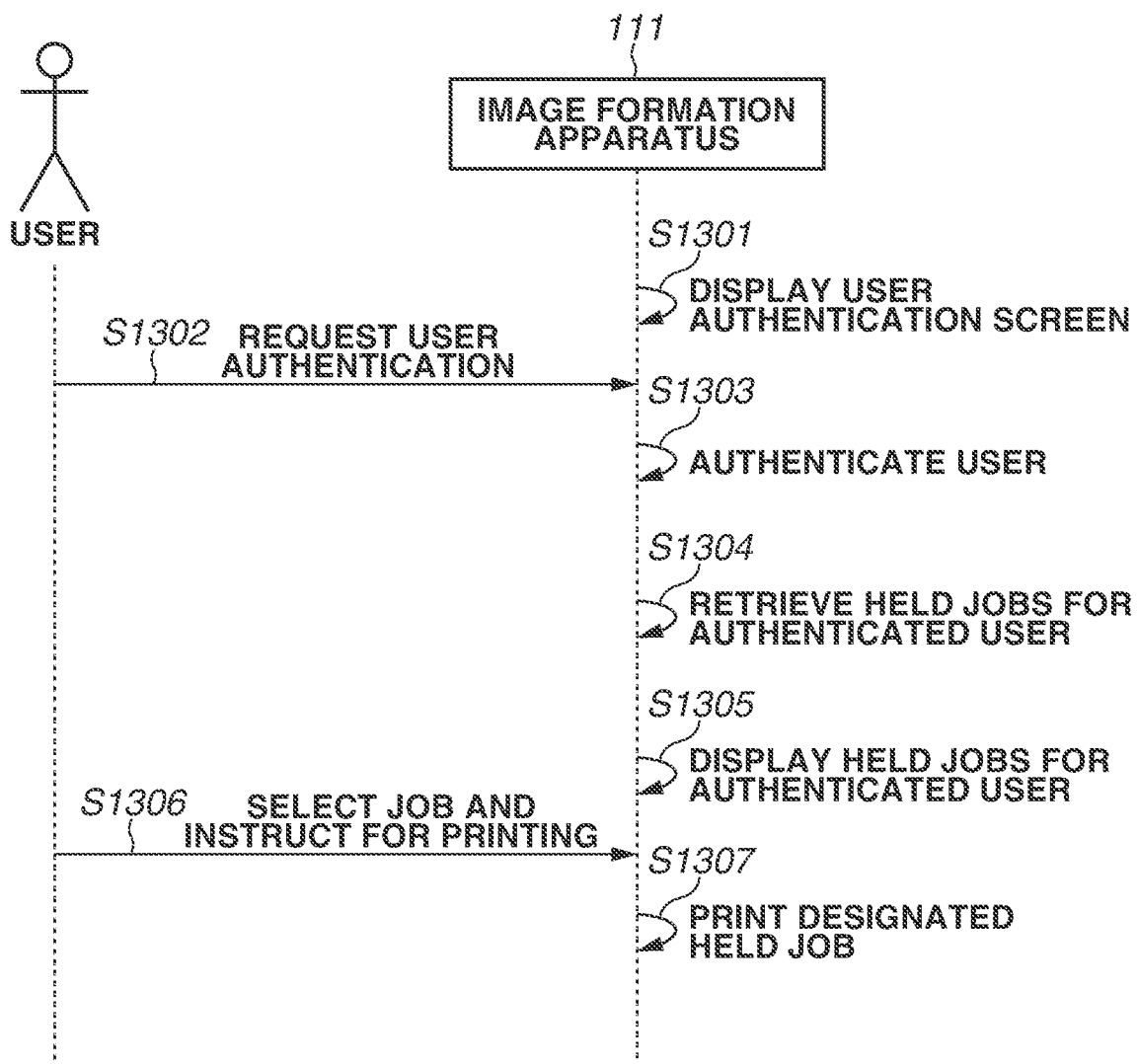
FIG. 13 is a sequence diagram illustrating a flow of print processing of a held job in the image formation apparatus according to one embodiment.
Figure 15:
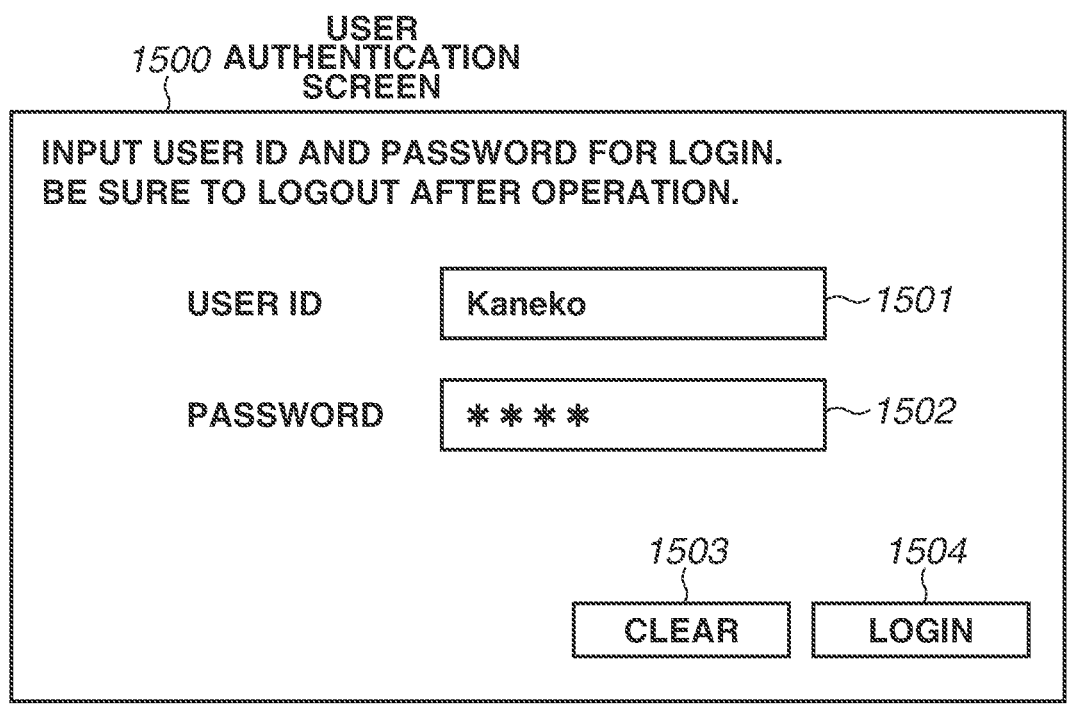
FIG. 15 illustrates an example of a user authentication screen of the image formation apparatus according to one embodiment.
Figure 16:
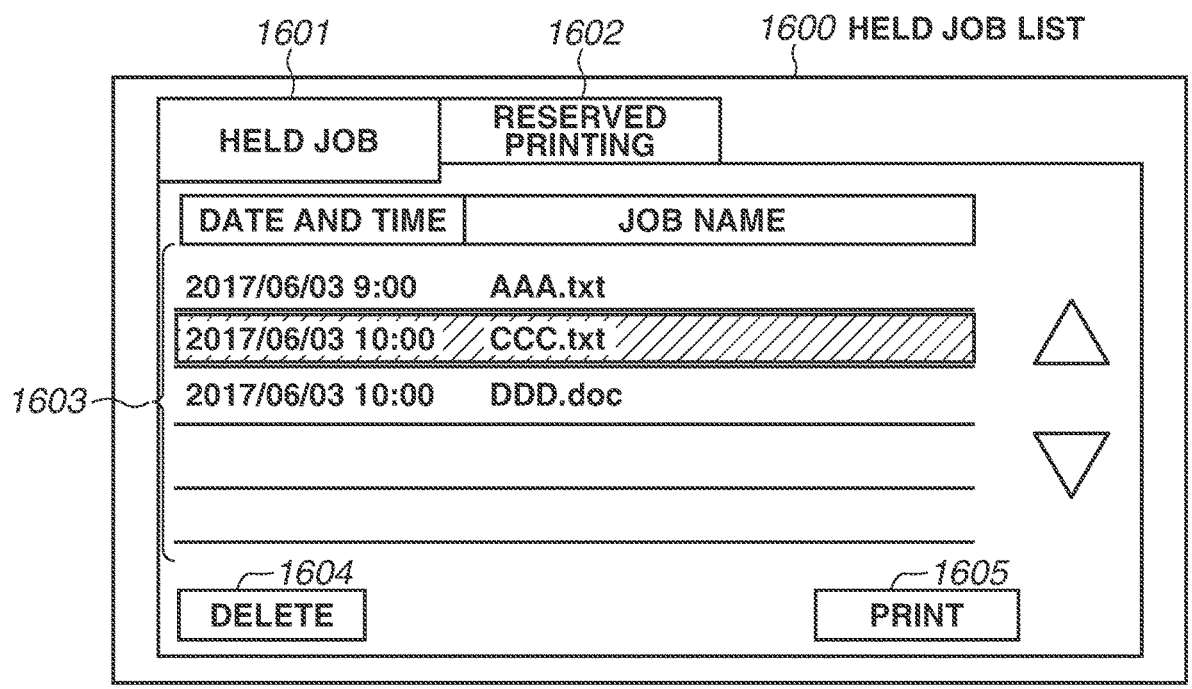
FIG. 16 illustrates an example of a held job list screen of the image formation apparatus according to one embodiment.

FIG. 13 is a sequence diagram illustrating an outline of processing performed by the print job management unit 502 to execute a held job stored in the auxiliary storage device 303 under instruction from the user. In step S1301, the user authentication unit 503 displays a user authentication screen 1500 illustrated in FIG. 15 on the image display device 304. In the user authentication screen 1500, an area 1501 is intended for inputting the user ID, and an area 1502 is intended for inputting a password. A clear button 1503 is intended for initializing the contents of inputs to the area 1501 or 1502. A login button 1504 is intended for executing user authentication processing. When the user inputs the user ID and the password and presses the login button 1504 to request user authentication in step S1302, the user authentication unit 503 performs user authentication processing in step S1303. The details of the user authentication processing are not important in the present exemplary embodiment, and thus detailed description thereof will be omitted. Afterward, the print job management unit 502 can identify the user ID processed in the user authentication processing in step S1303 at an arbitrary timing. If the user authentication is successful, the print job management unit 502 refers to the user ID and the output method 2204 in the held job list 2200 and retrieves the held jobs for the authenticated user in step S1304. When the print job management unit 502 retrieves the held jobs for the authenticated user in step S1304, the print job management unit 502 displays a held job list 1600 illustrated in FIG. 16 on the image display device 304 in step S1305. In the held job list 1600, an area 1603 is intended for displaying a list of contents of the held jobs. A button 1604 is intended for deleting a held job selected in the list display 1603. A button 1605 is a button intended for executing a held job selected in the list display 1603. When the user selects an arbitrary job and presses a print button 1605 in the held job list 1600 in step S1306, the print job management unit 502 executes the selected held job by the printing device 307 in step S1307.

As above, when reserved print jobs reservation times of which are designated are received from the information processing terminal, only the reserved print jobs the reservation times of which are set within a specific time period can be accepted. Accordingly, it is possible to restrict a time period during which large-volume printing of reserved print jobs is allowed, thereby to improve printing environments for time periods other than the restricted time period.

As the first exemplary embodiment, the control method for reserved print jobs by which large-volume printing of reserved prints is restricted to a certain time period and large-volume printing of reserved print jobs in time periods other than the restricted time period is disabled has been described. As a second exemplary embodiment, a control method for reserved print jobs by which reserved print jobs involving large-volume printing are disabled regardless of time periods will be described.

The second exemplary embodiment is the same as the first exemplary embodiment in the configuration of a hold printing system, the inner configuration and software of an information processing terminal, the inner configuration and software of an image formation apparatus, the configuration of a print job, the configuration of a held job list, and the like, and thus descriptions of these configurations will be omitted. As the present exemplary embodiment, only differences from the first exemplary embodiment will be described.

Figure 18:
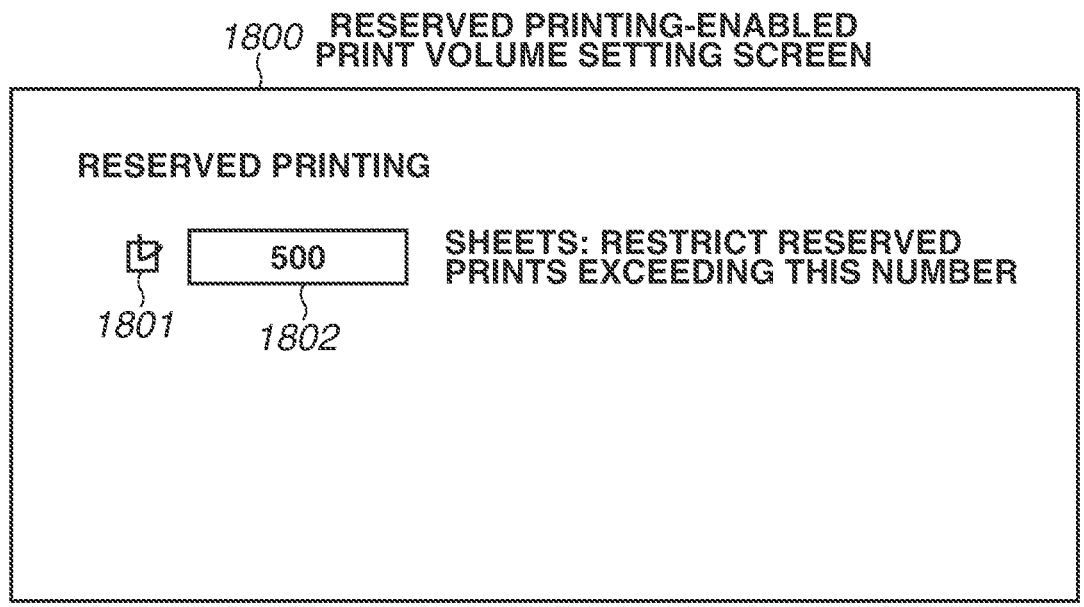
FIG. 18 illustrates a reserved printing-enabled print volume setting screen in the image formation apparatus according to one embodiment.

FIG. 18 illustrates a screen 1800 for setting a reserved printing-enabled print volume in the image formation apparatus 111. In this screen, a predetermined number of printed sheets indicating the reserved printing-enabled print volume is set. That is, the image formation apparatus accepts the reserved print job when the number of printed sheets designated by the information about a reserved print job is less than or equal to the predetermined number of printed sheets set in this screen. For example, in a case where the reserved printing-enabled print volume is 500 sheets, the reserved printing is not permitted if the print volume 2105 of the print job 2100 received by the image formation apparatus 111 is 501 sheets, whereas the reserved printing is permitted if the print volume 2105 is 500 sheets. The print volume 2105 is identified by the arbitrary application 401 or the printer driver 402 when the printer driver 402 generates the print job in step S614 or S713.

A check box 1801 is intended for designating whether to set the reserved printing-enabled print volume. In a case where the check box 1801 is not checked, no reserved printing-enabled print volume is set and the reserved printing is permitted at any time. In a case where the check box 1801 is checked, only reserved print jobs with the print volume 2105 less than or equal to the numeric value set in a field 1802 are permitted. The reserved printing-enabled use amount set in the screen 1800 for setting the reserved printing-enabled use amount is saved as reserved printing-enabled use amount 2500 by the print job management unit 502 in the RAM 302 or the auxiliary storage device 303.

TABLE 2

| Reserved printing-enabled use amount 2500 | | |
|---|---|---|
| Print volume restriction | n (n = 0: not restricted, n = 1: restricted) | 2501 |
| Restricted print volume | 500 | 2502 |

The software 500 can refer to the reserved printing-enabled use amount 2500 at an arbitrary timing. A print volume restriction 2501 in the use amount 2500 reflects the content of the setting in the check box 1801 in the screen 1800. In a case where the check box 1801 is not checked, the print volume restriction 2501 is 0, whereas, in a case where the check box 1801 is checked, the print volume restriction 2501 is 1. A restricted print volume 2502 in the reserved printing-enabled use amount 2500 is set to the numeric value designated in the field 1802 in the screen 1800.

In the present exemplary embodiment, the print volume is defined by the number of sheets. However, the present disclosure is also applicable to a system in which the print volume is defined by the number of printed copies. In that case, for example, in a case where the reserved printing-enabled print volume is 100 copies, the reserved printing is not permitted if the print volume 2105 of the print job 2100 received by the image formation apparatus 111 is 101 copies, whereas the reserved printing is permitted if the print volume 2105 is 100 copies.

Figure 9:
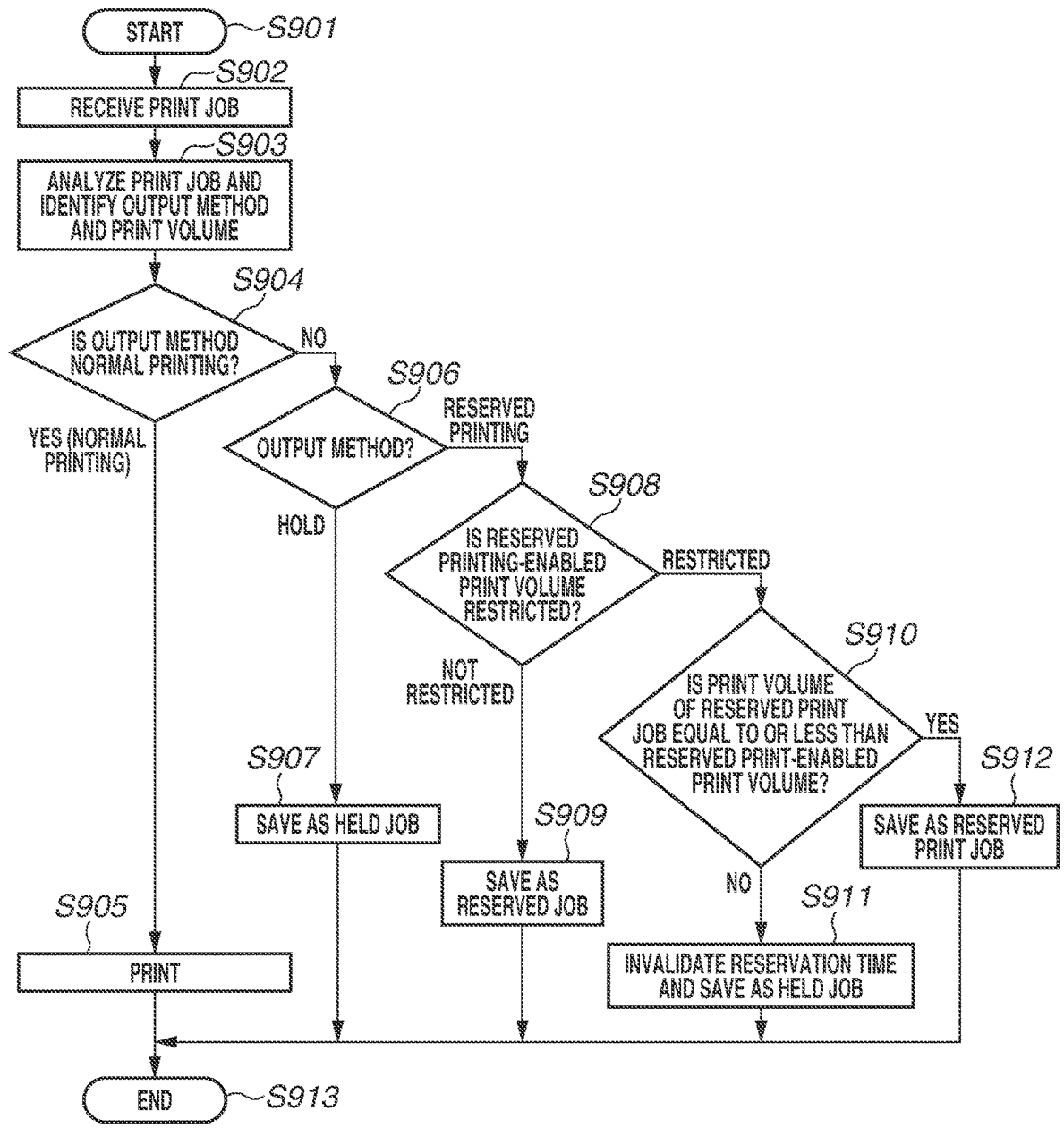
FIG. 9 is a flowchart illustrating a flow of print job reception processing in the image formation apparatus according to one embodiment.

FIG. 9 is a flowchart illustrating the details of processing performed by the software 500 running on the image formation apparatus 111. When the print job acceptance unit 501 receives the print job 2100 in step S902, the print job management unit 502 analyzes the output method 2103 of the print job 2100 in step S903. If the print job management unit 502 determines in step S904 that the output method 2103 is "normal printing", the print job management unit 502 executes the print job 2100 using the printing device 307 in step S905. If the print job management unit 502 determines in step S904 that the output method is not "normal printing", the print job management unit 502 determines in step S906 whether the output method is "hold" or "reserved printing". If the print job management unit 502 determines in step S906 that the output method is "hold", the print job management unit 502 saves the received print job 2100 as a held job in step S907. More specifically, the print job management unit 502 saves the print job 2100 in the auxiliary storage device 303 and adds the print job 2100 the output method 2204 of which is "hold" to the held job list

2200 illustrated in FIG. 22. In a case where the print job management unit 502 determines in step S906 that the output method 2103 is "reserved printing", the print job management unit 502 refers to the print volume restriction 2501 in the reserved printing-enabled use amount 2500 to check whether the print volume is restricted in step S908. That is, the print job management unit 502 checks whether an acceptance condition for a reserved job is set. If the print job management unit 502 determines in step S908 that the print volume is not restricted, the print job management unit 502 saves the print job 2100 as a reserved print job in step S909. More specifically, the print job management unit 502 saves the print job 2100 in the auxiliary storage device 303, and adds the print job 2100 the output method 2204 of which is "reserved printing" to the held job list 2200. If the print job management unit 502 determines in step S908 that the print volume is restricted, the print job management unit 502 checks whether the print volume 2105 of the print job 2100 is less than or equal to the restricted print volume 2502 in step S910. If the print job management unit 502 determines in step S910 that the print volume 2105 is not less than or equal to the restricted print volume 2502, the print job management unit 502 saves the received print job 2100 as a held job in step S911. More specifically, the print job management unit 502 saves the print job 2100 in the auxiliary storage device 303, and adds the print job 2100 the output method 2204 of which is "hold", not "reserved printing", to the held job list 2200 illustrated in FIG. 22. When the print job management unit 502 determines in step S910 that the print volume 2105 is less than or equal to the restricted print volume 2502, the print job management unit 502 saves the received print job 2100 as a reserved print job in step S912.

In the present exemplary embodiment, the print job management unit 502 saves the print job 2100 as a held job in in step S911. In an alternative mode, the print job management unit 502 may cancel the job.

Accordingly, when reserved print jobs reservation times of which are designated are received from the information processing terminal, it is possible to accept only the reserved print jobs the print volumes of which are equal to or less than a predetermined number. Accordingly, it is possible to inhibit large-volume printing of reserved print jobs.

As the first and second exemplary embodiments, the control method for reserved print jobs by which execution of reserved printing is restricted to a certain time period and volume so that reserved printing is permitted in a restricted range, and by which it is possible to prevent and inhibit the possibility of reduction in working efficiency due to large-volume printing of reserved print jobs during business hours in the daytime has been described.

As the first and second exemplary embodiments, hold printing has been mentioned in which a received print job is not performed immediately but is held temporarily in the image formation apparatus and then is executed in response to a print instruction issued by the user. For the hold printing, there is a forced hold function by which a print job input by the user is forcedly held in the image formation apparatus. The forced hold function allows a received print job to be forcedly held without being executed, thereby inhibiting leakage of information due to an unattended print material. Under such a forced hold environment, if a reserved print job the reservation time of which is designated as one minute later, for example, is accepted, this is almost tantamount to executing the print job without being held, so that it is not possible to inhibit generation of an unattended print material. Thus, the image formation apparatus generally does not accept any print job as a reserved print job under the forced hold environment. If the forced hold function is introduced in an environment where large-volume reserved printing is executed late at night, any reserved print job will not be accepted as described above. In a case where large-volume printing is desired in such an environment, the large-volume printing have to be performed during the business hours, which may hinder other users' printing.

As a third exemplary embodiment, a control method for reserved print jobs by which a time period during which no forced holding is applied to reserved print jobs even under a forced hold environment is set and reserved print jobs the reservation times of which are designated within the time period to which no forced holding is applied are accepted as reserved print jobs will be described. The third exemplary embodiment is the same as the first exemplary embodiment in the configuration of a hold printing system, the inner configuration and software of an information processing terminal, the inner configuration and software of an image formation apparatus, the configuration of a print job, the configuration of a held job list, and the like, and thus descriptions of these configurations will be omitted. As the present exemplary embodiment, only differences from the first exemplary embodiment will be described.

Figure 19:
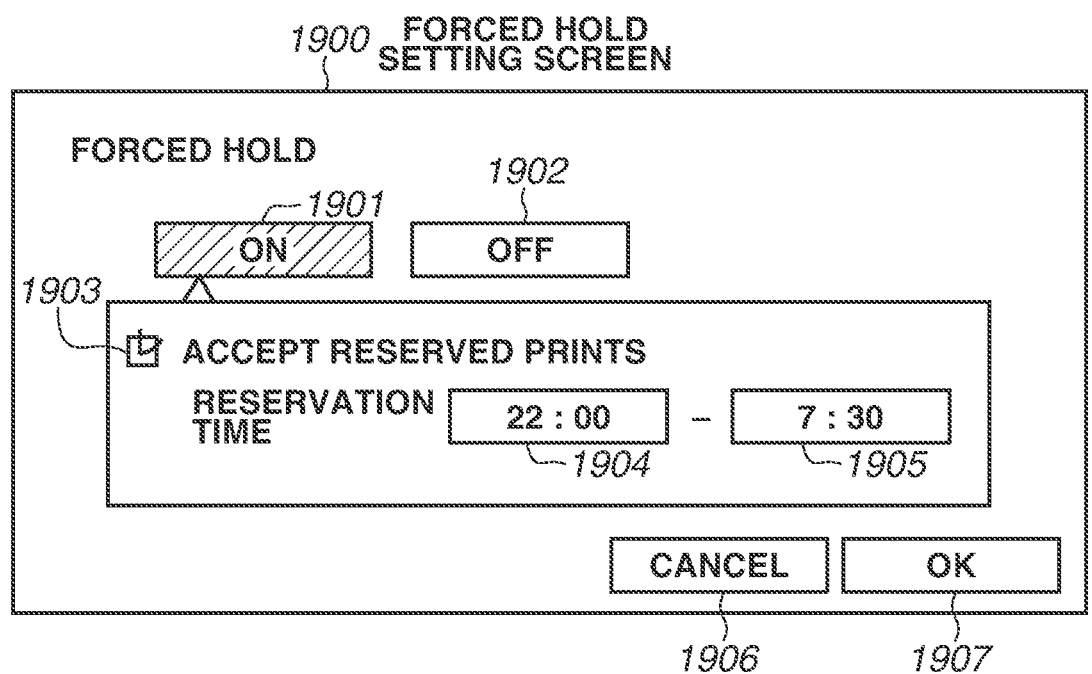
FIG. 19 illustrates a forced hold setting screen in the image formation apparatus according to one embodiment.

FIG. 19 illustrates a forced hold setting screen 1900 for making forced hold settings in the image formation apparatus 111. In the present exemplary embodiment, in a case where the forced hold is off (button 1902), the image formation apparatus 111 executes the accepted print job, or saves the accepted print job as a held job, or saves the accepted print job as a reserved job, depending on the designation of the output method 1406 in the print setting screen 1400. In a case where the forced hold is on (button 1901), the image formation apparatus forcedly saves the accepted print job as a held job, regardless of the designation of the output method 1406 in the print setting screen 1400 by the user. However, if a check box 1903 for accepting reserved print jobs is checked and the reservation time is designated in fields 1904 and 1905, the image formation apparatus accepts reserved print jobs the reservation times 2104 of which are designated within the time period designated in the fields 1904 and 1905. In the forced hold setting screen 1900, either one of buttons 1901 and 1902 is to be pressed.

The forced hold setting made in the forced hold setting screen 1900 is saved as forced hold setting 2600 by the print job management unit 502 in the RAM 302 or the auxiliary storage device 303.

TABLE 3

| Forced hold setting 2600 | | |
|---|---|---|
| Forced hold | n (n = 0: off, n = 1: on) | 2601 |
| Reserved printing exception | m (m = 0: without exception, 1: with exception) | 2602 |
| Exception start time | 2200 (HHMM) | 2603 |
| Exception end time | 0730 (HHMM) | 2604 |

The software 500 can refer to the forced hold setting 2600 at an arbitrary timing. A forced hold 2601 in the forced hold setting 2600 reflects the content of the setting by the button 1901 or 1902 in the forced hold setting screen 1900. When the button 1901 is pressed, the forced hold 2601 is 1, whereas, when the button 1902 is pressed, the forced hold 2601 is 0. A reserved printing exception 2602 in the forced hold setting 2600 reflects the content of the setting in the check box 1903 in the forced hold setting screen 1900. If the check box 1903 is not checked, the reserved printing exception 2602 is 0, whereas, if the check box 1903 is checked, the reserved printing exception 2602 is 1. An exception start time 2603 in the forced hold setting 2600 is set to the time designated in the field 1904 in the forced hold setting screen 1900. An exception end time 2604 in the forced hold setting 2600 is set to the time designated in the field 1905 in the forced hold setting screen 1900. In this way, it is possible to make a setting for accepting reserved print jobs as exceptional processing of the forced hold setting.

Figure 10:
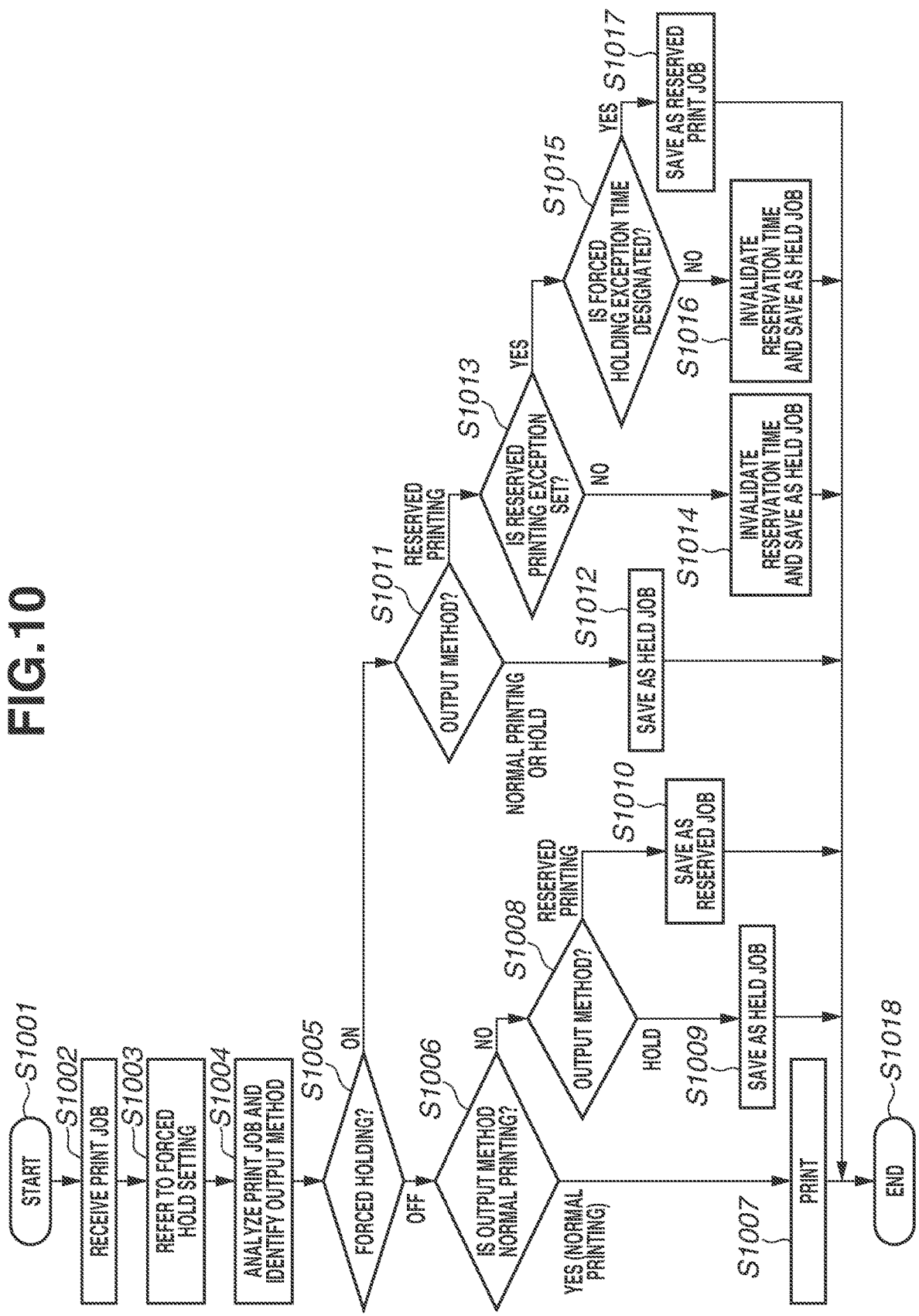
FIG. 10 is a flowchart illustrating a flow of print job reception processing in the image formation apparatus according to one embodiment.

FIG. 10 is a flowchart illustrating the details of processing performed by the software 500 running on the image formation apparatus 111. When the print job acceptance unit 501 receives the print job 2100 in step S1002, the print job management unit 502 refers to the forced hold setting 2600 in step S1003. Then, the print job management unit 502 identifies the output method 2103 of the print job 2100 in step S1004. In a case where the print job management unit 502 determines in step S1005 that the forced hold 2601 is off, the print job management unit 502 determines in step S1006 whether the output method identified in step S1004 is normal printing. If the print job management unit 502 determines in step S1006 that the output method 2103 is normal printing, the print job management unit 502 executes the received print job 2100 by the printing device 307 in step S1007. If the print job management unit 502 determines in step S1006 that the output method 2103 is not normal printing, the print job management unit 502 determines whether the output method 2103 is hold or reserved printing in step S1008. If the print job management unit 502 determines in step S1008 that the output method 2103 is hold, the print job management unit 502 saves the received print job 2100 as a held job in step S1009. If the print job management unit 502 determines in step S1008 that the output method 2103 is reserved printing, the print job management unit 502 saves the received print job 2100 as a reserved job in step S1010. In a case where the print job management unit 502 determines in step S1005 that the forced hold 2601 is on, the print job management unit 502 determines in step S1011 the output method identified in step S1004. If the print job management unit 502 determines in step S1011 that the output method 2103 of the print job 2100 is normal printing or hold, the print job management unit 502 saves the print job as a held job in step S1012. If the print job management unit 502 determines in step S1011 that the output method 2103 of the print job 2100 is reserved printing, the print job management unit 502 refers to the reserved printing exception 2602 in step S1013. In a case where the print job management unit 502 determines in step S1013 that there is no reserved printing exception, the print job management unit 502 invalidates the reservation time of the received print job and saves the received print job as a held job in step S1014. If the print job management unit 502 determines in step S1013 that there is a reserved printing exception, the print job management unit 502 determines whether the reservation time 2104 of the print job 2100 is within the exception time period of forced hold in step S1015. Specifically, the print job management unit 502 checks whether the reservation time 2104 is within the range between the exception start time 2603 and the exception end time 2604. If the reservation time 2104 is within the range, the print job management unit 502 determines that the reservation time 2104 matches the exception time period, whereas, if the reservation time 2104 is not within the range, the print job management unit 502 determines that the reservation time 2104 does not match the exception time period. In a case where the print job management unit 502 determines in step S1015 that the reservation time 2104 is not within the exception time period, the print job management unit 502 invalidates the reservation time of the received print job 2100 and saves the received print job 2100 as a held job in step S1016. If the print job management unit 502 determines in step S1015 that the reservation time 2104 is within the exception time period, the print job management unit 502 saves the received print job 2100 as a reserved print job in step S1017.

In the present exemplary embodiment, in steps S1014 and S1016, the print job management unit 502 invalidates the reservation time of the reserved print job 2100 and saves the reserved print job 2100 as a held job. In an alternative mode, the print job management unit 502 may cancel the job.

As above, even under a forced hold environment, setting the time period during which forced hold is not applied to reserved print jobs allows for reserved printing the reservation times of which are designated within that time period (for example, late night hours). Accordingly, even under a forced hold environment, it is possible to reserve large-volume printing the reservation times of which are designated in late night hours, for example, thereby preventing other users' printing from being hindered by large-volume printing in daytime business hours.

As the third exemplary embodiment, the job control method by which, even under a forced hold environment, the time period during which forced hold is not applied to reserved printing is set so that large-volume printing can be performed in late night hours, for example. As a fourth exemplary embodiment, a job control method by which setting a time period during which forced hold is not applied to any printing including reserved printing so that large-volume printing can be performed in late night hours, for example, will be described. The fourth exemplary embodiment is the same as the first to third exemplary embodiments in the configuration of a hold printing system, the inner configuration and software of an information processing terminal, the inner configuration and software of an image formation apparatus, the configuration of a print job, the configuration of a held job list, and the like, and thus descriptions thereof will be omitted. As the present exemplary embodiment, only differences from the third exemplary embodiment will be described.

Figure 20:
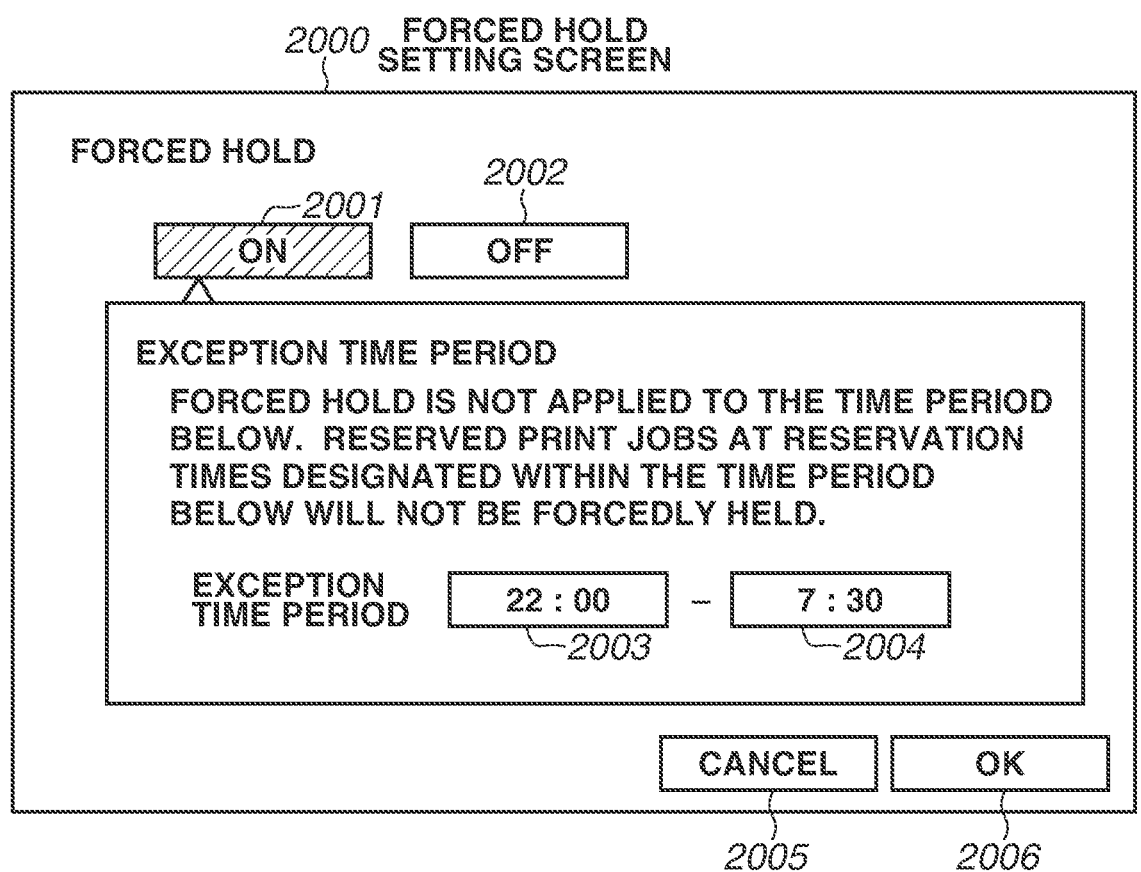
FIG. 20 illustrates a forced hold setting screen in the image formation apparatus according to one embodiment.

FIG. 20 illustrates a forced hold setting screen 2000 for making forced hold settings in the image formation apparatus 111. In the present exemplary embodiment, when the forced hold is off (off 2002), the image formation apparatus 111 performs the accepted print job, or saves the accepted print job as a held job, or saves the accepted print job as a reserved job, depending on the designation of the output method 1406 in the print setting screen 1400. When the forced hold is on (on 2001), the image formation apparatus 111 forcedly saves the accepted print job as a held job, regardless of the designation of the output method 1406 in the print setting screen 1400 by the user. However, the forced holding is not applied in the time period designated in fields 2003 and 2004 during which job control will be performed as when the forced holding is off. The forced hold is not applied to reserved printing the reservation time 2104 of which is within the time period designated in the fields 2003 and 2004. In the forced hold setting screen 2000, either one of the buttons 2001 and 2002 is to be pressed.

The forced hold setting made in the forced hold setting screen 2000 is saved as forced hold setting 2600 by the print job management unit 502 in the RAM 302 or the auxiliary storage device 303.

TABLE 4

| Forced hold setting 2700 | | |
| --- | --- | --- |
| Forced hold | n (n = 0: off, n = 1: on) | 2701 |
| Exception start time | 2200 (HHMM) | 2702 |
| Exception end time | 0730 (HHMM) | 2703 |

The software 500 can refer to the forced hold setting 2700 at an arbitrary timing. An item 2701 in the forced hold setting 2700 reflects the content of the setting in the button 2001 or 2002 in the forced hold setting screen 2000. In a case where the button 2001 is pressed, the forced hold 2701 is 1, whereas, in a case where the button 2002 is pressed, the forced hold 2701 is 0. An exception start time 2702 in the forced hold setting 2700 is set to the time designated in the field 2003 in the forced hold setting screen 2000. An exception end time 2703 in the forced hold setting 2600 is set to the time designated in the field 2004 in the force hold setting screen 2000.

Figure 11:
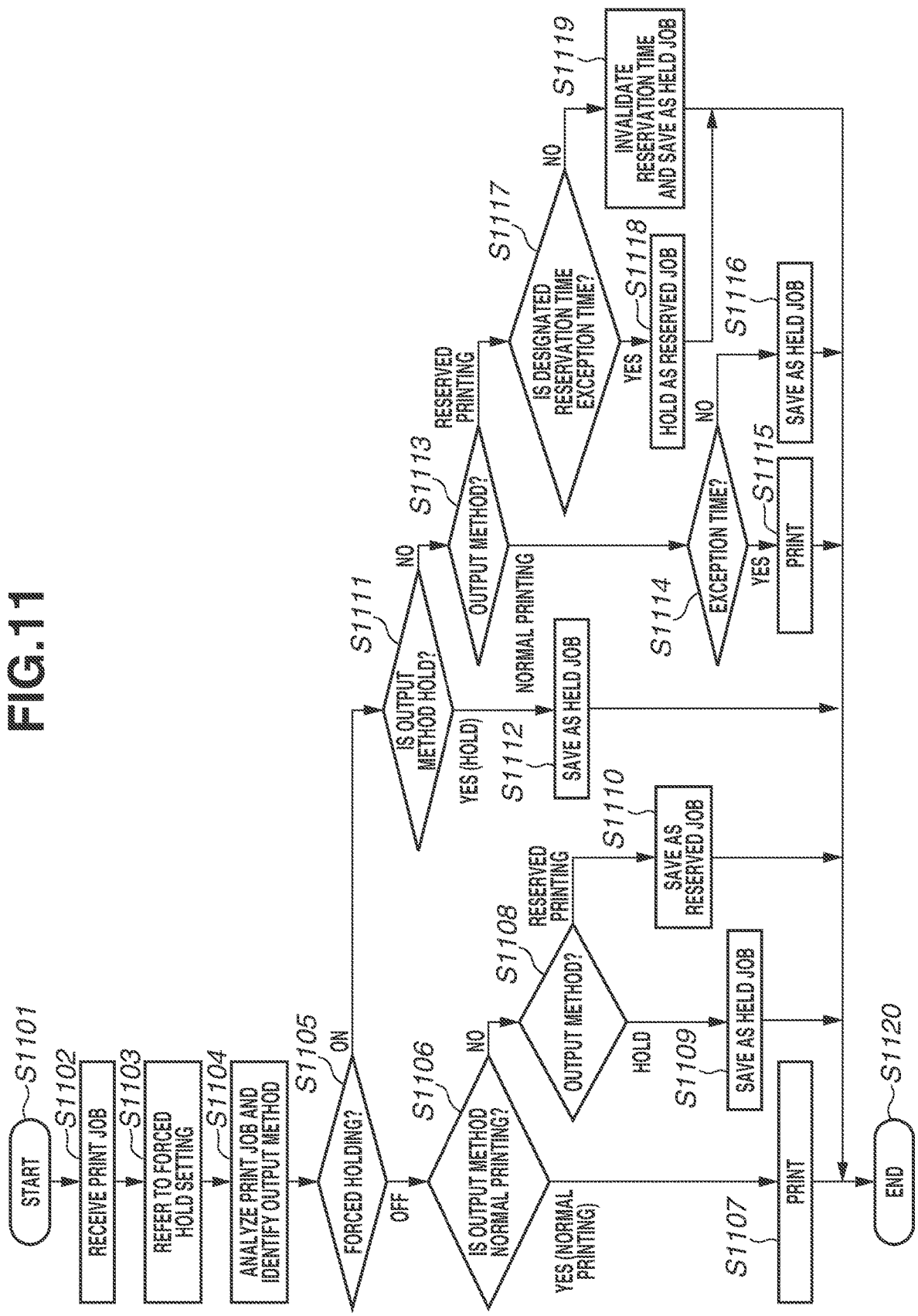
FIG. 11 is a flowchart illustrating a flow of print job reception processing in the image formation apparatus.

FIG. 11 is a flowchart illustrating the details of processing performed by the software 500 running on the image formation apparatus 111. When the print job acceptance unit 501 receives the print job 2100 in step S1102, the print job management unit 502 refers to the forced hold setting 2700 in step S1103. Then, the print job management unit 502 identifies the output method 2103 of the print job 2100 in step S1104. If the print job management unit 502 determines that the forced hold 2701 is off, the print job management unit 502 determines the output method identified in step S1104, in step S1106. If the print job management unit 502 determines in step S1106 that the output method 2103 is normal printing, the print job management unit 502 executes the received print job 2100 by the printing device 307 in step S1107. If the print job management unit 502 determines in step S1106 that the output method is not normal printing, the print job management unit 502 determines whether the output method is hold or reserved printing in step S1108. In a case where the print job management unit 502 determines in step S1108 that the output method 2103 is hold, the print job management unit 502 saves the received print job 2100 as a held job in step S1109. If the print job management unit 502 determines in step S1108 that the output method 2103 is reserved printing, the print job management unit 502 saves the received print job 2100 as a reserved job in step S1110. In a case where the print job management unit 502 determines in step S1105 that the forced hold 2701 is on, the print job management unit 502 determines the output method identified in step S1104, in step S1111. If the print job management unit 502 determines in step S1111 that the output method 2103 of the print job 2100 is hold, the print job management unit 502 saves the print job as a held job in step S1112. If the print job management unit 502 determines in step S1111 that the output method 2103 of the print job 2100 is not hold, the print job management unit 502 determines whether the output method 2103 of the print job 2100 is normal printing or reserved printing in step S1113. In a case where the print job management unit 502 determines in step S1113 that the output method 2103 of the print job 2100 is normal printing, the print job management unit 502 determines whether the current time is included in the exception time period (within the range between the exception start time 2702 and the exception end time 2703) in step S1114. If the print job management unit 502 determines in step S1114 that the current time is included in the exception time period, the print job management unit 502 executes the print job 2100 using the printing device 307 in step S1115.

If the print job management unit 502 determines in step S1114 that the current time is not included in the exception time period, the print job management unit 502 saves the print job 2100 as a held job in step S1116. In a case where the print job management unit 502 determines in step S1113 that the output method 2103 of the print job 2100 is reserved printing, the print job management unit 502 determines whether the reservation time 2104 is included in the exception time period (the range between the exception start time 2702 and the exception end time 2703) in step S1117. If the print job management unit 502 determines in step S1117 that the reservation time 2104 is included in the exception time period, the print job management unit 502 holds the print job 2100 as a reserved job in step S1118. If the print job management unit 502 determines in step S1117 that the reservation time 2104 is not included in the exception time period, the print job management unit 502 invalidates the reservation time of the print job 2100 and saves the print job 2100 as a held job in step S1119.

In the present exemplary embodiment, in step S1119, the print job management unit 502 invalidates the reservation time of the print job 2100 and saves the print job 2100 as a held job. In an alternative mode, the print job management unit 502 may cancel the job.

As above, even under a forced hold environment, setting the time period during which forced hold is not applied to reserved printing enables reserved printing during that time period if the reservation times are designated within that time period (for example, late night hours). Accordingly, even under a forced hold environment, it is possible to reserve large-volume printing the reservation times of which are designated in late night hours, for example, thereby preventing other users' printing from being hindered by large-volume printing in daytime business hours.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-056556, filed Mar. 26, 2020, which is hereby incorporated by reference herein in its entirety.

What is claimed is:

1. A printing apparatus configured to execute a print job, the printing apparatus comprising:
one or more memories storing a set of instructions; and
one or more processors that execute the set of instructions to:
set a print-permitted period of a scheduled print job for which a job execution time is designated;
receive a scheduled print job for which a job execution time is designated; and
store the received scheduled print job in a storage device,
wherein, in a case where the job execution time designated for the received scheduled print job is within the set print-permitted period, the received scheduled print job is stored in the storage device in a manner such that the received scheduled print job is to be executed at the job execution time designated for the received scheduled print job, and
wherein the stored scheduled print job is executed at the job execution time designated for the stored scheduled print job,
wherein, in a case where the job execution time designated for the received scheduled print job is not within the set print-permitted period, the received scheduled print job is not stored in the storage device.

2. The printing apparatus according to claim 1,
wherein, in a case where the job execution time designated for the received scheduled print job is not within the set print-permitted period, the received scheduled print job is not executed at the job execution time designated for the received scheduled print job, and the received scheduled print job is stored in the storage device in a manner such that execution of the received scheduled print job does not occur until after such time that a print instruction for the received scheduled print job for which information has been received, is accepted from a user, and
wherein, when the print instruction for the received scheduled print job is accepted from the user with an operation unit of the printing apparatus, the received scheduled print job related to the print instruction is executed.

3. The printing apparatus according to claim 1, wherein, in a case where the print-permitted period of a scheduled print job for which a job execution time is designated has not been set, the received scheduled print job is stored in the storage device in a manner such that the received scheduled print job is to be executed at the job execution time designated for the received scheduled print job.

4. The printing apparatus according to claim 1, wherein the one or more processors further execute the set of instructions to:
make a second setting relating to print jobs designated for reserved printing, the second setting providing for storing the received information of such a print job in the storage device, the second setting preventing execution of the print job until acceptance of a print instruction from the user, and
wherein, in a case where the second setting is made, the print-permitted period is set as exceptional processing of the second setting.

5. The printing apparatus according to claim 1, wherein the printing apparatus includes the storage device.

6. The printing apparatus according to claim 1, wherein a printing apparatus different from the printing apparatus includes the storage device.

7. A control method for a printing apparatus configured to execute a print job, the control method comprising:
storing a setting relating to print jobs designated for reserved printing indicating an acceptance condition for accepting a print job designated for reserved printing, wherein the print job designated for reserved printing is a print job for which a job execution time is designated;
setting a print-permitted period of a scheduled print job for which a job execution time is designated;
receiving a schedule print job for which a job execution time is designated; and
storing the received scheduled print job in a storage device,
wherein, in a case where the job execution time designated for the received scheduled print job is within the set print-permitted period, the received scheduled print job is stored in the storage device in a manner such that the received scheduled print job is to be executed at the job execution time designated for the received scheduled print job, and
wherein the stored scheduled print job is executed at the job execution time designated for the stored scheduled print job,
wherein, in a case where the job execution time designated for the received scheduled print job is not within the set print-permitted period, the received scheduled print job is not stored in the storage device.

8. A non-transitory computer readable storage medium on which is stored a computer program for making a computer execute a control method for a printing apparatus configured to execute a print job, the control method comprising:
storing a setting relating to print jobs designated for reserved printing indicating an acceptance condition for accepting a print job designated for reserved printing, wherein the print job designated for reserved printing is a print job for which a job execution time is designated;
setting a print-permitted period of a scheduled print job for which a job execution time is designated;
receiving a schedule print job for which a job execution time is designated; and
storing the received scheduled print job in a storage device,
wherein, in a case where the job execution time designated for the received scheduled print job is within the set print-permitted period, the received scheduled print job is stored in the storage device in a manner such that the received scheduled print job is to be executed at the job execution time designated for the received scheduled print job, and
wherein the stored scheduled print job is executed at the job execution time designated for the stored scheduled print job,
wherein, in a case where the job execution time designated for the received scheduled print job is not within the set print-permitted period, the received scheduled print job is not stored in the storage device.

* * * * *